United States Patent
Limberg

(10) Patent No.: US 8,311,141 B2
(45) Date of Patent: *Nov. 13, 2012

(54) TIME-DEPENDENT TRELLIS CODING FOR MORE ROBUST DIGITAL TELEVISION SIGNALS

(75) Inventor: Allen LeRoy Limberg, Port Charlotte, FL (US)

(73) Assignee: Samsung Electronics Co., Ltd., Suwon-si (KR)

(*) Notice: Subject to any disclaimer, the term of this patent is extended or adjusted under 35 U.S.C. 154(b) by 314 days.

This patent is subject to a terminal disclaimer.

(21) Appl. No.: 12/692,206

(22) Filed: Jan. 22, 2010

(65) Prior Publication Data
US 2010/0118208 A1    May 13, 2010

Related U.S. Application Data

(63) Continuation of application No. 10/955,212, filed on Sep. 30, 2004, now Pat. No. 7,668,250, which is a continuation-in-part of application No. 10/885,460, filed on Jul. 6, 2004, now abandoned.

(60) Provisional application No. 60/485,327, filed on Jul. 7, 2003, provisional application No. 60/507,797, filed on Oct. 1, 2003, provisional application No. 60/524,984, filed on Nov. 25, 2003, provisional application No. 60/531,124, filed on Dec. 19, 2003.

(51) Int. Cl.
*H04L 23/02* (2006.01)
*H04L 5/12* (2006.01)

(52) U.S. Cl. .......................... 375/265; 375/301; 375/321

(58) Field of Classification Search .................. 375/265, 375/301, 302, 130
See application file for complete search history.

(56) References Cited

U.S. PATENT DOCUMENTS

| | | | |
|---|---|---|---|
| 4,748,496 A * | 5/1988 | Drury et al. | 348/435.1 |
| 5,448,299 A | 9/1995 | Yang et al. | |
| 5,600,672 A | 2/1997 | Oshima et al. | |
| 6,430,159 B1 * | 8/2002 | Wan et al. | 370/246 |
| 6,724,832 B1 | 4/2004 | Hershberger | |
| 6,760,077 B2 | 7/2004 | Choi et al. | |
| 6,922,215 B2 | 7/2005 | Choi et al. | |
| 6,924,847 B2 | 8/2005 | Choi et al. | |
| 6,956,619 B2 | 10/2005 | Choi et al. | |
| 6,967,690 B2 | 11/2005 | Choi et al. | |
| 6,973,137 B2 * | 12/2005 | Birru et al. | 375/265 |
| 6,980,603 B2 | 12/2005 | Choi et al. | |
| 7,027,103 B2 | 4/2006 | Choi et al. | |
| 7,030,935 B2 | 4/2006 | Choi et al. | |
| 7,050,511 B2 * | 5/2006 | Jeong et al. | 375/301 |
| 7,068,326 B2 | 6/2006 | Choi et al. | |
| 7,092,455 B2 | 8/2006 | Choi et al. | |
| 7,167,212 B2 | 1/2007 | Choi et al. | |
| 7,480,851 B2 * | 1/2009 | Chang et al. | 714/792 |
| 2005/0249301 A1 * | 11/2005 | Jeong et al. | 375/265 |
| 2006/0039503 A1 * | 2/2006 | Choi et al. | 375/301 |
| 2009/0055708 A1 * | 2/2009 | Chang et al. | 714/758 |

* cited by examiner

*Primary Examiner* — David Ometz
*Assistant Examiner* — Qutbuddin Ghulamali
(74) *Attorney, Agent, or Firm* — Sughrue Mion, PLLC

(57) ABSTRACT

Different sets symbols are precluded at prescribed times in time-dependent trellis coding. This increases the distances between different individual symbols as well as the distances between trellis codes, which increases the robustness of data transmission. The symbols that are precluded in this time-dependent trellis coding are determined in advance according to a prescribed pattern, which pattern does not depend on the history of previous symbols. The Viterbi decoder used for trellis decoding in a receiver can be designed to take advantage of knowledge concerning which different sets of symbols are precluded at prescribed times.

20 Claims, 13 Drawing Sheets

| ADDRESS | X-SUB-ONE | ADDRESS | X-SUB-ONE |
|---------|-----------|---------|-----------|
| 000000 | 1 | 011000 | 0 |
| 000001 | 0 | 011001 | 1 |
| 000010 | 1 | 011010 | 0 |
| 000011 | 0 | 011011 | 1 |
| 000100 | 0 | 011100 | 1 |
| 000101 | 1 | 011101 | 0 |
| 000110 | 1 | 011110 | 0 |
| 000111 | 0 | 011111 | 1 |
| 001000 | 0 | 100000 | 1 |
| 001001 | 1 | 100001 | 0 |
| 001010 | 0 | 100010 | 1 |
| 001011 | 1 | 100011 | 0 |
| 001100 | 1 | 100100 | 0 |
| 001101 | 0 | 100101 | 1 |
| 001110 | 1 | 100110 | 0 |
| 001111 | 0 | 100111 | 1 |
| 010000 | 0 | 101000 | 1 |
| 010001 | 1 | 101001 | 0 |
| 010010 | 1 | 101010 | 0 |
| 010011 | 0 | 101011 | 1 |
| 010100 | 0 | 101100 | 1 |
| 010101 | 1 | 101101 | 0 |
| 010110 | 0 | 101110 | 1 |
| 010111 | 1 | 101111 | 0 |

ROUTINE TO VALIDATE INSERTION OF RESTRICTED-ALPHABET DATA SEGMENTS INTO TDM

START.

RESET SEGMENT SLOT COUNTER TO NUMBER CORRESPONDING TO PROPOSED POSITION OF FINAL DATA SEGMENT OF PAIR WITHIN A DATA FIELD.

RANDOMIZE DATA PACKET WITH PRBS FOR SEGMENT SLOT COUNT.

PERFORM 1ST TYPE LATERAL (207, 187) R-S FEC CODING ON RANDOMIZED DATA PACKET TO GENERATE SEED DATA SEGMENT.

RE-SAMPLE 1ST HALF OF SEED DATA SEGMENT OF X-SUB-2 BITS BY ALTERNATING THOSE BITS WITH X-SUB-1 BITS OF PRESCRIBED PATTERN TO HALVE CODE RATE & GENERATE INITIAL DATA SEGMENT OF PAIR.

PERFORM 1ST TYPE LATERAL (207, 187) R-S FEC DECODING ON INITIAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, RE-SAMPLE 2ND HALF OF SEED DATA SEGMENT OF X-SUB-2 BITS BY ALTERNATING THOSE BITS WITH X-SUB-1 BITS OF PRESCRIBED PATTERN TO HALVE CODE RATE & TO GENERATE FINAL DATA SEGMENT OF PAIR.

PERFORM 1ST TYPE LATERAL (207, 187) R-S FEC DECODING ON FINAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, INSERT PAIR OF DATA SEGMENTS INTO TIME-DIVISION MULTIPLEX INTO POSITIONS CORRESPONDING WITH FINALLY PROPOSED POSITION OF FINAL DATA SEGMENT OF PAIR.

FINISH.

Fig. 10

ROUTINE TO VALIDATE INSERTION OF RESTRICTED-ALPHABET DATA SEGMENTS INTO TDM

START.

RESET SEGMENT SLOT COUNTER TO NUMBER CORRESPONDING TO PROPOSED POSITION OF FINAL DATA SEGMENT OF PAIR WITHIN A DATA FIELD.

RANDOMIZE DATA PACKET WITH PRBS FOR SEGMENT SLOT COUNT.

PERFORM 1ST TYPE LATERAL (207, 187) R-S FEC CODING ON RANDOMIZED DATA PACKET TO GENERATE SEED DATA SEGMENT.

RE-SAMPLE 1ST HALF OF SEED DATA SEGMENT BY IMMEDIATELY REPEATING EACH BIT THEREOF TO HALVE CODE RATE & GENERATE INITIAL DATA SEGMENT OF PAIR.

PERFORM 1ST TYPE LATERAL (207, 187) R-S FEC DECODING ON INITIAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, RE-SAMPLE 2ND HALF OF SEED DATA SEGMENT BY IMMEDIATELY REPEATING EACH BIT THEREOF TO HALVE CODE RATE & GENERATE FINAL DATA SEGMENT OF PAIR.

PERFORM 1ST TYPE LATERAL (207, 187) R-S FEC DECODING ON FINAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, INSERT PAIR OF DATA SEGMENTS INTO TIME-DIVISION MULTIPLEX INTO POSITIONS CORRESPONDING WITH FINALLY PROPOSED POSITION OF FINAL DATA SEGMENT OF PAIR.

FINISH.

Fig. 11

ROUTINE TO VALIDATE INSERTION OF RESTRICTED-ALPHABET TRS-PARITY-BYTE SEGMENTS INTO TDM

START.

RESET SEGMENT SLOT COUNTER TO NO. CORRESPONDING TO PROPOSED POSITION OF FINAL DATA SEGMENT OF PAIR WITHIN A DATA FIELD.

PERFORM 2ND TYPE LATERAL (207, 187) R-S FEC CODING ON PACKET OF TRS PARITY BYTES TO GENERATE SEED DATA SEGMENT.

RE-SAMPLE 1ST HALF OF SEED DATA SEGMENT OF X-SUB-2 BITS BY ALTERNATING THOSE BITS WITH X-SUB-1 BITS OF PRESCRIBED PATTERN TO HALVE CODE RATE & GENERATE INITIAL DATA SEGMENT OF PAIR.

PERFORM 1ST TYPE LATERAL (207, 187) R-S FEC DECODING ON INITIAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, RE-SAMPLE 2ND HALF OF SEED DATA SEGMENT OF X-SUB-2 BITS BY ALTERNATING THOSE BITS WITH X-SUB-1 BITS OF PRESCRIBED PATTERN TO HALVE CODE RATE & TO GENERATE FINAL DATA SEGMENT OF PAIR.

PERFORM 1ST TYPE LATERAL (207, 187) R-S FEC DECODING ON FINAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, INSERT PAIR OF DATA SEGMENTS INTO TIME-DIVISION MULTIPLEX INTO POSITIONS CORRESPONDING WITH FINALLY PROPOSED POSITION OF FINAL DATA SEGMENT OF PAIR.

FINISH.

Fig. 12

ROUTINE TO VALIDATE INSERTION OF RESTRICTED-ALPHABET TRS-PARITY-BYTE SEGMENTS INTO TDM

START.

RESET SEGMENT SLOT COUNTER TO NO. CORRESPONDING TO PROPOSED POSITION OF FINAL DATA SEGMENT OF PAIR WITHIN A DATA FIELD.

PERFORM 3RD TYPE LATERAL (207, 187) R-S FEC CODING ON PACKET OF TRS PARITY BYTES TO GENERATE SEED DATA SEGMENT.

RE-SAMPLE 1ST HALF OF SEED DATA SEGMENT BY IMMEDIATELY REPEATING EACH BIT THEREOF TO HALVE CODE RATE & GENERATE INITIAL DATA SEGMENT OF PAIR.

PERFORM 1ST TYPE LATERAL (207, 187) R-S FEC DECODING ON INITIAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, RE-SAMPLE 2ND HALF OF SEED DATA SEGMENT BY IMMEDIATELY REPEATING EACH BIT THEREOF TO HALVE CODE RATE & TO GENERATE FINAL DATA SEGMENT OF PAIR.

PERFORM 1ST TYPE LATERAL (207, 187) R-S FEC DECODING ON FINAL DATA SEGMENT OF PAIR.

DOES RESULTING DATA PACKET HAVE BOTH VALID PID & TEI INDICATING CORRECTABLE BYTE ERROR?

IF YES, INCREMENT SEGMENT SLOT COUNT & RE-START ROUTINE.

IF NO, INSERT PAIR OF DATA SEGMENTS INTO TIME-DIVISION MULTIPLEX INTO POSITIONS CORRESPONDING WITH FINALLY PROPOSED POSITION OF FINAL DATA SEGMENT OF PAIR.

FINISH.

Fig. 13

TIME-DEPENDENT TRELLIS CODING FOR MORE ROBUST DIGITAL TELEVISION SIGNALS

This is a continuation application of application Ser. No. 10/955,212 filed Sep. 30, 2004, which is a continuation-in-part of application Ser. No. 10/885,460 filed 6 Jul. 2004 under 35 U.S.C. §111(a) claiming pursuant to 35 U.S.C. §119(e)(1) benefit of the filing date of provisional U.S. patent application Ser. No. 60/485,327 filed 7 Jul. 2003, pursuant to 35 U.S.C. §111(b). This application, filed under 35 U.S.C. 111(a), claims pursuant to 35 U.S.C. 119(e)(1) benefit of the filing dates of provisional U.S. patent application Ser. Nos. 60/507,797, 60/524,984 and 60/531,124 filed under 35 U.S.C. 111(b) on 1 Oct. 2003, 25 Nov. 2003 and 19 Dec. 2003, respectively. These provisional patent applications in their entirety are incorporated by reference herein.

This invention relates to symbol coding of digital signals such as those used for broadcasting digital television.

BACKGROUND OF THE INVENTION

The MPEG-2 standard addresses the combining of one or more elementary streams of video, audio and other data into single or multiple streams that are suitable for storage or transmission. In very general terms, the MPEG-2 standard for transmitting digital video, the associated audio and other information involves the following three steps. In the first step, a digital video signal (from a digital camera or from an analog to digital converter) is compressed by analyzing and encoding the signal using spatial and temporal redundancy. Spatial redundancy refers to the redundant information inside one video frame while temporal redundancy refers to the redundant information between consecutive frames. This process generates: Intra-frames (I-frames), which contain all of the information in an entire image; Predicted frames (P-Frames), which have some compression as they are predicted based on past I-frames and/or other P-frames; and Bi-directionally predicted frames (B-frames), which are the most compressed images as they are predicted from past and future I-Frames and P-Frames. In the second step carried out concurrently with the first step, an audio signal is compressed by removing low-power tones adjacent high-power tones. Removal of these tones does not affect the signal, because the high-power tones tend to mask the lower-power tones, making them inaudible to the human ear. In the final third step, the compressed video signals, audio signals and related time stamps of those signals are assembled into packets and inserted into a Packetized Elementary Stream (PES). Each packet in a packetized elementary stream contains overhead information such as a start code, stream ID, packet length, optional packetized elementary stream header and stuffing bytes, in addition to the actual packet bytes of video and audio data.

To facilitate the multiplexing together of several streams of packetized elementary streams of different types of data, a Programme Specific Information (PSI) table is also created, which includes a series of tables to reassemble specific packetized elementary stream within multiple channels of packetized elementary streams. The packetized elementary stream and the program specific information provide the basis for a Transport Stream (TS) of packetized elementary stream and program specific information packets.

Of particular interest to the invention disclosed herein is the transport stream as defined in Annex D of the "ATSC Digital Television Standard" published by the Advanced Television Systems Committee (ATSC) in September 1995 as its document A/53. This standard defines the broadcasting of digital television (DTV) signals within the United States of America and is referred to in this specification simply as "A/53". Annex D specifies that the original data transport stream is composed of 187-byte packets of data corresponding to MPEG-2 packets without their initial sync bytes Annex D specifies that data are to be randomized by being exclusive-ORed with a specific $2^{16}$-bit maximal length pseudo-random binary sequence (PRBS) which is initialized at the beginning of each data field. Annex D specifies (207, 187) Reed-Solomon forward-error-correction (R-S FEC) coding of packets of randomized data followed by convolutional interleaving. The convolutional interleaving prescribed by A/53 provides error correction capability for continuous burst noise up to 193 microseconds (2070 symbol epochs) in duration. The convolutionally interleaved data with R-S FEC coding are subsequently trellis coded to ⅔ original code rate and mapped into eight-level digital symbols. The symbols are parsed into 828-symbol sequences.

Annex D specifies that the data frame shall be composed of two data fields, each data field composed of 313 data segments, and each data segment composed of 832 symbols. Annex D specifies that each data segment shall begin with a 4-symbol data-segment-synchronization (DSS) sequence. Annex D specifies that the initial data segment of each data field shall contain a data-field-synchronization (DFS) signal following the 4-symbol DSS sequence therein. The DSS and DFS signals are composed of symbols with +5 or −5 modulation signal values. The $2^{nd}$ through $313^{th}$ data segments each conclude with a respective one of the trellis-coded 828-symbol sequences, the convolutional interleaving of which sequences extends to a depth of 52 data segments. The digital symbols are transmitted by eight-level modulation with +7, +5, +3, +1, −1, −3, −5 and −7 modulation signal values. Owing to the A/53 baseband DTV signal being transmitted via vestigial-sideband suppressed-carrier amplitude modulation of a radio-frequency carrier, this eight-level modulation signal is referred to as trellis-coded 8VSB signal. These transmissions are accompanied by a pilot carrier of the same frequency as the suppressed carrier and of an amplitude corresponding to modulation value of +1.25.

The fifth through $515^{th}$ symbols in the initial data segment of each data field are a specified PN511 sequence—i. e., a pseudo-random noise sequence composed of 511 symbols capable of being rendered as +5 or −5 modulation signal values. The $516^{th}$ through $704^{th}$ symbols in the initial data segment of each data field are a triple-PN63 sequence. The middle PN63 sequence is inverted in sense of polarity every other data field. The $705^{th}$ through $728^{th}$ symbols in the initial data segment of each data field contain a VSB mode code specifying the nature of the vestigial-sideband (VSB) signal being transmitted. The remaining 104 symbols in the initial data segment of each data field are reserved, with the last twelve of these symbols being a precode signal that repeats the last twelve symbols of the data in the last data segment of the previous data field. A/53 specifies such precode signal to implement trellis coding and decoding procedures being resumed in the second data segment of each field, proceeding from where those procedures left off processing the data in the preceding data field.

The 8VSB transmissions have a 10.76 million bits per second baud rate to fit within a 6-megahertz-wide broadcast television channel, and the effective payload is 19.3 million bits per second (Mbps). In an additive-white Gaussian noise (AWGN) channel a perfect receiver will require at least a 14.9 dB signal-to-nose ratio (SNR) in order to keep errors below a threshold-of-visibility (TOV) defined as 1.93 data segment errors per 10,000 data segments, supposing 8VSB signals are broadcast.

After the "ATSC Digital Television Standard" was established in 1995, reception of terrestrial broadcast DTV signals proved to be problematic, particularly if indoor antennas were used. In early 2000 ATSC made an industry-wide call for experts in terrestrial broadcast transmission and reception to join a Task Force on RF System Performance for studying problems with adequate reception and suggesting possible solutions to those problems. By the end of 2000 or so there was general consensus that, besides problems with equalization of the reception channel, there was a need to make the 8VSB signal more robust, if it were to be successfully received during noisy reception conditions. On 26 Jan. 2001 the ATSC Specialist Group on RF Transmission (T3/S9) issued a "Request for Proposal for Potential Revisions to ATSC Standards in the Area of Transmission Specifications". This RFP concerning how to improve the performance of 8VSB was directed to the DTV industry, universities and other parties interested in the problem. The widely distributed T3/S9 RFP specifies backward-compatible improvement of fixed and indoor 8-VSB terrestrial DTV service to be of top priority. The requirement for backward-compatibility with legacy DTV receivers means, among other things, that the trellis coding specified in A/53 must be maintained throughout data fields.

A general approach to making 8VSB signal more robust is to increase the amount of forward-error-correction coding. Zenith Electronics and ATI proposed the application of preliminary additional trellis coding to data before the trellis coding specified by A/53. Legacy DTV receivers already in the field are incapable of receiving the data with the additional trellis coding, however.

The general concept that FEC coding can be contained in data packets that do not contain payload data and that are separate from data packets that do contain payload is found in U.S. Pat. No. 6,430,159, the specification and drawing of which are incorporated herein by reference. U.S. Pat. No. 6,430,159 titled "Forward error correction at MPEG-2 transport stream layer" issued Aug. 6, 2002 to Xiang Wan and Marc H. Morin. Wan and Morin sought to provide a system and method to correct an MPEG-2 transport stream that could be used in any one of the digital video broadcast formats, without the need for FEC decoders which were specific to the particular format. Another objective of the U.S. Pat. No. 6,430,159 invention was to avoid appending FEC coding to the end of each packet, in effect adding another layer to the protocol stack. Such a new layer is specific to the transmission architecture and not subject to the MPEG-2 standard, so a broadcaster has to rely upon each intended receiver having a symmetric FEC decoder for the transmitted signal to be received. However, the satellite broadcast industry, the cablecasting industry and the terrestrial broadcast industry embraced the practice of inserting the original transport stream into a forward-error-correction encoder and broadcasting the resulting signal over their respective broadcast medium to receivers. The various receivers for satellite broadcast, cablecasting and terrestrial broadcast systems recover MPEG-2-compliant transport streams from received signals, using FEC decoders specific to the various systems and symmetric with the FEC encoders employed in these various systems.

A. L. R. Limberg ran across U.S. Pat. No. 6,430,159 during a comprehensive review of DTV receiver practice he conducted in 2002 when working on the revision of the "Guide to the Use of the ATSC Digital Television Standard" published in October 1995 as ATSC Document A/54. Limberg perceived that the Wan and Morin concept still had practical utility, even though (207, 187) R-S FEC coding was appended to data segments of 8VSB DTV broadcast signal, employing the sort of practice Wan and Morin had sought to avoid by their invention. Limberg perceived that transverse Reed-Solomon forward-error-correction coding facilitates additional error-correction coding being time-division multiplexed with A/53 data segments in such a way that DTV receivers already in the field can still receive the A/53 data segments. Limberg understood that the Wan and Morin concept was the key to solving the problem of making the DTV signals more robust without making those signals impossible to be received by DTV receivers already in the field. This was the problem that had stumped experts in DTV system design for two years or more despite T3/S9 having focused industry effort on solving this problem. Limberg discerned that transverse R-S FEC coding was orthogonal to "lateral" (207, 187) R-S FEC coding prescribed by A/53 and combined therewith to provide two-dimensional R-S FEC coding.

An alternative approach to making 8VSB signal more robust is to restrict the symbol alphabet in such a way that symbol decoding procedures are less susceptible of error. For example, a set of limited-alphabet 8VSB symbols that map data into just +7, +5, −5 and −7 modulation signal values was proposed by Philips Research responsive to the T3/S9 RFP. This limited-alphabet signal is referred to as "pseudo-2VSB" or "P-2VSB", since the polarity of the signal suffices to convey the information in the resulting modulation signal. Using P-2VSB throughout the entire DTV broadcast halves the effective payload to 9.64 million bits per second (Mbps), but this is more than sufficient to transmit a standard-definition television (SDTV) signal. The gap between the least negative normalized modulation level, −5, and the least positive normalized modulation level, +5, is 10. This is five times the gap of 2 between adjacent normalized modulation levels in an 8VSB signal. The 8VSB signal has ⅔ trellis coding, however, which increases its performance capability to be somewhat better than a 4VSB signal with a gap of 4 between adjacent normalized modulation levels. Accordingly, the SNR required in order to keep errors below TOV in an AWGN channel is reduced to 8.5 dB, a reduction of 6.4 dB. That is, about a quarter as much power would be required for satisfactory reception of an AWGN channel, presuming that modulation levels did not have to be decreased to maintain effective radiated power (ERP) levels within current specification. The ERP of the P-2VSB symbols tends to increase respective to conventional trellis-coded 8VSB, because of just the +7, +5, −5 and −7 modulation signal values being used and the +3, +1, −1 and −3 modulation signal values of 8VSB not being used. A 1.5 dB decrease in transmitter ERP is necessary if long sequences of P-2VSB symbols are transmitted. So, if long sequences of P-2VSB symbols are transmitted, the increase in service area for the P-2VSB signal is only that which could be achieved with a 4.9 dB increase in the power of a conventional trellis-coded 8VSB signal. Furthermore, service area for the conventional trellis-coded 8VSB signal accompanying the P-2VSB signal is diminished. Consequently, P-2VSB signals have been considered only for only a limited number of the data segments in each 313-segment data field.

The Electronics and Telecommunications Research Institute (ETRI) and Chonnnam National University (CNU) Multimedia Communications Laboratory in South Korea proposed another set of restricted-alphabet 8VSB symbols that map data into just +7, +1, −3 and −5 normalized modulation signal values. This type of signal is referred to as "enhanced- 4VSB" or "E-4VSB". The gap between the least negative normalized modulation level, −3, and the least positive normalized modulation level, +1, is 4. This is twice the gap of 2 between adjacent modulation levels in an 8VSB signal, permitting TOV under AWGN conditions to be achieved at significantly poorer SNR than is the case with 8VSB signal. The SNR that E-4VSB requires to keep errors below TOV is higher than that required with pseudo-2VSB modulation.

The ERP of the E-4VSB symbols is purportedly the same as that of conventional trellis-coded 8VSB. Consequently, considerably more data segments in data fields can code E-4VSB modulation than can code pseudo-2VSB signals, presuming that ERP is not to be increased very much. E-4VSB is presumably less likely than pseudo-2VSB to disrupt the operation of legacy receivers, particularly those that rely on symbol averaging to develop automatic gain control signals for controlling the gains of their amplifier stages. The limitation on the number of the data segments in each 313-segment data field that can be E-4VSB signals depends solely on the number of data segments of normal transmissions that must be provided to accommodate legacy receivers. The more asymmetrical symbol constellation benefits symbol synchronization using bright-spectral-line techniques.

Certain modifications of the original data transport stream cause the trellis coding procedure at the transmitter to generate 8VSB symbols with various restrictions of the available symbol alphabet. Each bit in a stream of randomized data can be repeated to generate a modified stream of data supplied to the (207, 187) R-S FEC encoder, for example, to cause a pseudo-2VSB signal to be generated by the trellis coding procedure. In other procedures for restricting the symbol alphabet for each symbol epoch, each bit in a stream of randomized data can be followed by an additional bit of prescribed value independent of the bit it follows.

By way of example, ONE can be inserted after each bit in a stream of randomized data to generate a modified stream of data supplied to the (207, 187) R-S FEC encoder. This modified stream of data causes the trellis coding procedure to generate a restricted-alphabet signal which excludes the −7, −5, +1 and +3 symbol values of the full 8VSB alphabet. Pilot carrier energy is increased substantially in the resulting modulation, which makes synchronous demodulation easier in the DTV receiver. The gap between the least negative normalized modulation level, −5, and the least positive normalized modulation level, +1, is 6 in this restricted-alphabet signal. This gap is three times the gap of 2 between adjacent modulation levels in an 8VSB signal, permitting TOV to be achieved at significantly poorer SNR under AWGN conditions than is the case with 8VSB signal or with E-4VSB signal. Better SNR under AWGN conditions is required to achieve TOV than is the case with pseudo-2VSB. This restricted-alphabet signal has substantially less average power than a pseudo-2VSB signal, but somewhat higher average power than normal 8VSB signal.

By way of counterexample, a ZERO can be inserted after each bit in a stream of randomized data to generate a modified stream of data supplied to the (207, 187) R-S FEC encoder. This modified stream of data causes the trellis coding procedure to generate a restricted-alphabet signal which excludes the −3, −1, +5 and +7 symbol values of the full 8VSB alphabet. The gap between the least negative normalized modulation level, −5, and the least positive normalized modulation level, +1, is also 6 in this restricted-alphabet signal. However, this restricted-alphabet signal has somewhat less average power than normal 8VSB signal. A difficult problem with using this restricted-alphabet signal is that the polarity of the pilot signal is reversed in the resulting modulation, which interferes with synchronous demodulation in DTV receivers, particularly legacy ones.

The inventor subsequently discerned that the 8VSB alphabet can be restricted in such a way that, in accordance with a prescribed pattern, a ZERO or a ONE is inserted as an $X_1$ bit after each of the $X_2$ bits in a data segment to be incorporated into a data field for randomization, R-S FEC coding, convolutional interleaving, and trellis coding. If ZEROes and ONEs occur with similar frequency in the pattern, ERP can be kept substantially the same as in an ordinary 8VSB signal described in Annex D of A/53. This requires careful selection of the prescribed pattern of inserting ZEROes and ONEs as $X_1$ bits. If symbols are correctly sampled, the gap between the least negative normalized modulation level and the least positive normalized modulation level is 6 in each symbol of this restricted-alphabet signal. This general type of restricted-alphabet signal, constructed from co-sets of a complete symbol alphabet that occur at prescribed times, is an important aspect of certain of the inventions described in this specification. This general type of restricted-alphabet signal is also useful in applications other than 8VSB DTV broadcasting, being useful in MPSK transmissions by way of example.

Viewed another way, this aspect of the invention concerns time-dependent trellis coding in which different sets of symbols are precluded at prescribed times in order to increase the Hamming distances between possible trellis codes. The symbols that are precluded are determined in advance according to a prescribed pattern, which pattern does not depend on the history of previous symbols. The pattern can be chosen to adjust the ERP of a transmitter such that average power is substantially the same as for symbol coding in which symbols are randomly selected from the full 8VSB symbol alphabet. This time-dependent trellis coding differs from extended trellis coding in which the symbols that are precluded are determined depending on the history of previous symbols. This time-dependent trellis coding is not subject to the tendency towards running error in the decoding of trellis code increasing as the code is extended. Each successive symbol in the time-dependent trellis code exhibits increased Euclidean distance respective to other symbols that could occur during that symbol epoch, so the possibility of error in hard-decision decoding is substantially reduced. This can be used for improving adaptive equalizer convergence during rapidly changing multipath conditions.

U.S. patent application Ser. No. 10/733,645 filed 12 Dec. 2003 for A. L. R. Limberg and titled "Robust Signal Transmissions in Digital Television Broadcasting" describes transverse Reed-Solomon forward-error-correction coding being used to supplement the error correction coding already in the 8VSB data segments. The parity bytes for the transverse Reed-Solomon forward-error-correction coding are arranged in A/53-compliant data segments to be time-division multiplexed with conventional A/53 data segments. The resulting signal is then convolutionally interleaved, trellis coded and mapped into 8VSB symbols per subsections 4.2.4 and 4.2.5 of A/53, Annex D. Patent application Ser. No. 10/733,645 specifically considers how transverse Reed-Solomon forward-error-correction coding of restricted-alphabet signals can be done. Patent application Ser. No. 10/733,645 discloses a problem that is encountered when one attempts to apply transverse Reed-Solomon forward-error-correction coding to restricted-alphabet signals in which the $Z_1$ bit in a symbol codeword elected for the restricted-alphabet signal cannot be determined independently of the $Z_0$ term. Suppose the parity bytes of the transverse R-S FEC coding were permitted to interleave convolutionally with bytes of such a restricted-alphabet signal. Then, the $Z_0$ bits in the symbol codewords of such a restricted-alphabet signal would depend on the $Z_1$ bits in the symbol codewords of the parity bytes of the transverse R-S FEC coding. However, the $Z_1$ bits in the symbol codewords of the parity bytes of the transverse R-S FEC coding should depend on the $Z_1$ bits of the symbol codewords in the restricted-alphabet signal. This is a situation of trying to "lift oneself by one's own bootstraps". E-4VSB signal has 001, 010, 100 and 111 symbol codewords that respectively generate −5, −3, +1 and +7 normalized modulation signal values. The $Z_1$ bits in the E-4VSB symbol codewords cannot be determined independently of the $Z_0$ bits, so the E-4VSB signal does not lend itself to transverse R-S FEC coding, at least not readily. Accordingly, there is a need for a type of robust modulation that halves code rate without affecting average ERP, but also better lends itself to transverse R-S FEC coding. U.S. patent application Ser. No. 10/733,645 issued 27 Mar. 2007 as U.S. Pat. No. 7,197,685 titled "Robust Signal Transmission in Digital Television Broadcasting" and is incorporated by reference herein.

The known types of robust modulation that halve code rate, but also lend themselves to transverse R-S FEC coding, are ones with a set of four symbol codewords for which the $Z_1$ bits can be determined independently of the $Z_0$ bits. The $Z_1$ bit repeats the $Z_2$ bit in all 3-bit symbol codewords of pseudo-2VSB signals, so pseudo-2VSB modulation lends itself to transverse R-S FEC coding. So does robust modulation wherein in accordance with a prescribed pattern a ZERO or a ONE is inserted as a respective $Z_1$ bit after the $Z_2$ bit in each 3-bit symbol codeword before it is supplied to a trellis encoder.

A previous practice when including robust transmissions in DTV signals has been to confine the robust transmissions to the 184-byte payload portions of data segments. Each data segment containing robust transmission begins with a 3-byte header that causes the data segment to be discarded by legacy 8VSB DTV receivers. Each data segment containing robust transmission concludes with twenty parity bytes of R-S FEC coding. MPEG-2 data packets do not map to an integral number of data segments when such previous practice is followed. Accordingly, such previous practice requires rather elaborate procedures for parsing data packets, especially since data segments associated with robust transmission have to be time-division multiplexed with data segments associated with ordinary HDTV transmission. The procedures for parsing data packets are apt to error during noisy reception.

The inventor prefers a new practice for including robust transmissions in DTV signals. In this preferred practice a data segment containing a 187-byte MPEG-2-compliant data packet and twenty bytes of lateral R-S FEC coding is converted into an integral number of consecutive data segments, such as two, which provides for simple parsing. The consecutive data segments generated by this simple conversion procedure will not be A/53 compliant, but this need not be problematic. Legacy DTV receivers are incapable of usefully receiving restricted-alphabet components of an 8VSB DTV broadcast signal anyway. Accordingly, the data segments including robust transmissions are freed from having to meet certain requirements, insofar as accommodating legacy DTV receivers is of concern. These data segments do not each need to include a data packet complying with MPEG-2, and these data segments do not each need to include parity bytes of "lateral" (207, 187) R-S FEC coding as prescribed by A/53. These data segments should be ones that legacy DTV receivers will discard during transport stream de-multiplexing, either because they do not appear to include a recognizable PID code or because they are found not to be correctable during R-S FEC decoding procedures. Each data packet that is to be transmitted using a restricted symbol alphabet can be evaluated ahead of time. The evaluations are made to ascertain which data randomization sequences would result in a legacy receiver finding one or both of the data segments derived from that data packet to contain both a valid PID and correctable byte errors. Transmission of the robust-data packet is scheduled in the data field so that each portion of that packet in a respective data segment uses a data randomization sequence that results in byte errors beyond the capability of correction by a standard (207, 187) R-S FEC decoder.

U.S. patent application Ser. No. 10/885,460 filed 6 Jul. 2004 for A. L. R. Limberg and titled "Reed-Solomon Coding Modifications for Signaling Transmission of Different Types of Data Packets" is incorporated by reference in this application. U.S. patent application Ser. No. 10/885,460 discloses an alternative way to cause the robust-data segments to contain byte errors beyond the capability of correction by a standard (207, 187) R-S FEC decoder. Each segment of robust data that contains byte errors within the capability of correction by a standard (207, 187) R-S FEC decoder is modified before transmission so this is no longer the case. The modification causes shortened R-S coding that is different than normal, so a legacy DTV receiver will find the robust-data segment to contain byte errors beyond the capability of correction by its (207, 187) R-S FEC decoder. A new DTV receiver will undo this modification responsive to a byte errors in a data segment being found to be correctable by a (207, 187) R-S FEC decoder for the shortened R-S coding that is different than normal.

A DTV receiver that is adapted for usefully receiving both full-alphabet and restricted-alphabet components of an 8VSB DTV broadcast signal has to have knowledge of when each of these components is being received. This knowledge permits symbol decoding of the restricted-alphabet components to be done in special way that improves the accuracy of symbol decoding decisions. The general procedure in the prior art is for the DTV transmitter to transmit information to the DTV receiver concerning the pattern of data segments recovered from restricted-alphabet components of the 8VSB DTV broadcast signal, which pattern obtains in each data field before being convolutionally interleaved and trellis coded. This information is transmitted in the reserved portion of the initial data segments of data fields, various coding schemes for such information being known. U.S. Pat. No. 6,563,436 titled "KERDOCK CODING AND DECODING SYSTEM FOR MAP DATA" and issued 13 May 2003 to M. Fimoff, R. W. Citta and J. Xia describes one way of doing this, for example. The pattern information is convolutionally interleaved to generate information concerning which symbols of the convolutionally interleaved data field received by the DTV receiver are selected from a restricted alphabet of 8VSB symbols. Certain of the data segments in the de-interleaved field that the de-interleaver generates from trellis coding results are recovered from restricted-alphabet components of the 8VSB DTV broadcast signal. The pattern information available to a DTV receiver is used in an additional way in novel DTV receivers described in this specification and its drawing. The pattern information is used to select these data segments for the data compression that converts them to a reduced number of data segments that comply with A/53 standards for data segments recovered from full-alphabet components of the 8VSB DTV broadcast signal.

SUMMARY OF THE INVENTION

The invention in various of its aspects concerns time-dependent trellis coding in which different sets symbols are precluded at prescribed times in order to increase distances between different individual symbols as well as the distances between trellis codes, which increases the robustness of data transmission. The symbols that are precluded are determined in advance according to a prescribed pattern, which pattern does not depend on the history of previous symbols.

An aspect of the invention is restricting the symbol alphabet of a digital television signal by inserting, in accordance with a prescribed pattern, a ZERO or a ONE after each bit in a data segment to be incorporated into a data field for randomization, R-S FEC coding, convolutional interleaving, and trellis coding. Transmitters for broadcasting DTV signals with the data segments so modified embody certain aspects of the invention. Receivers for receiving those DTV signals and reproducing data packets embody other aspects of the invention.

BRIEF DESCRIPTION OF THE DRAWING

FIG. 10 is a listing of the steps in a routine to validate the insertion of restricted-alphabet data segments into the time-division multiplex (TDM) signal that defines a data field before subsequent convolutional interleaving and trellis coding carried out in a DTV transmitter of FIG. 1 sort.

FIG. 11 is a listing of the steps in a routine to validate the insertion of restricted-alphabet data segments into the time-division multiplex (TDM) signal that defines a data field before subsequent convolutional interleaving and trellis coding carried out in a DTV transmitter of FIG. 1 sort modified per FIG. 4.

FIG. 12 is a listing of the steps in a routine to validate the insertion of restricted-alphabet data segments into the time-division multiplex (TDM) signal that defines a data field before subsequent convolutional interleaving and trellis coding carried out in a DTV transmitter of FIG. 6 sort.

FIG. 13 is a listing of the steps in a routine to validate the insertion of restricted-alphabet data segments into the time-division multiplex (TDM) signal that defines a data field before subsequent convolutional interleaving and trellis coding carried out in a DTV transmitter of FIG. 6 sort modified per FIG. 4.

DETAILED DESCRIPTION

Figure 1:
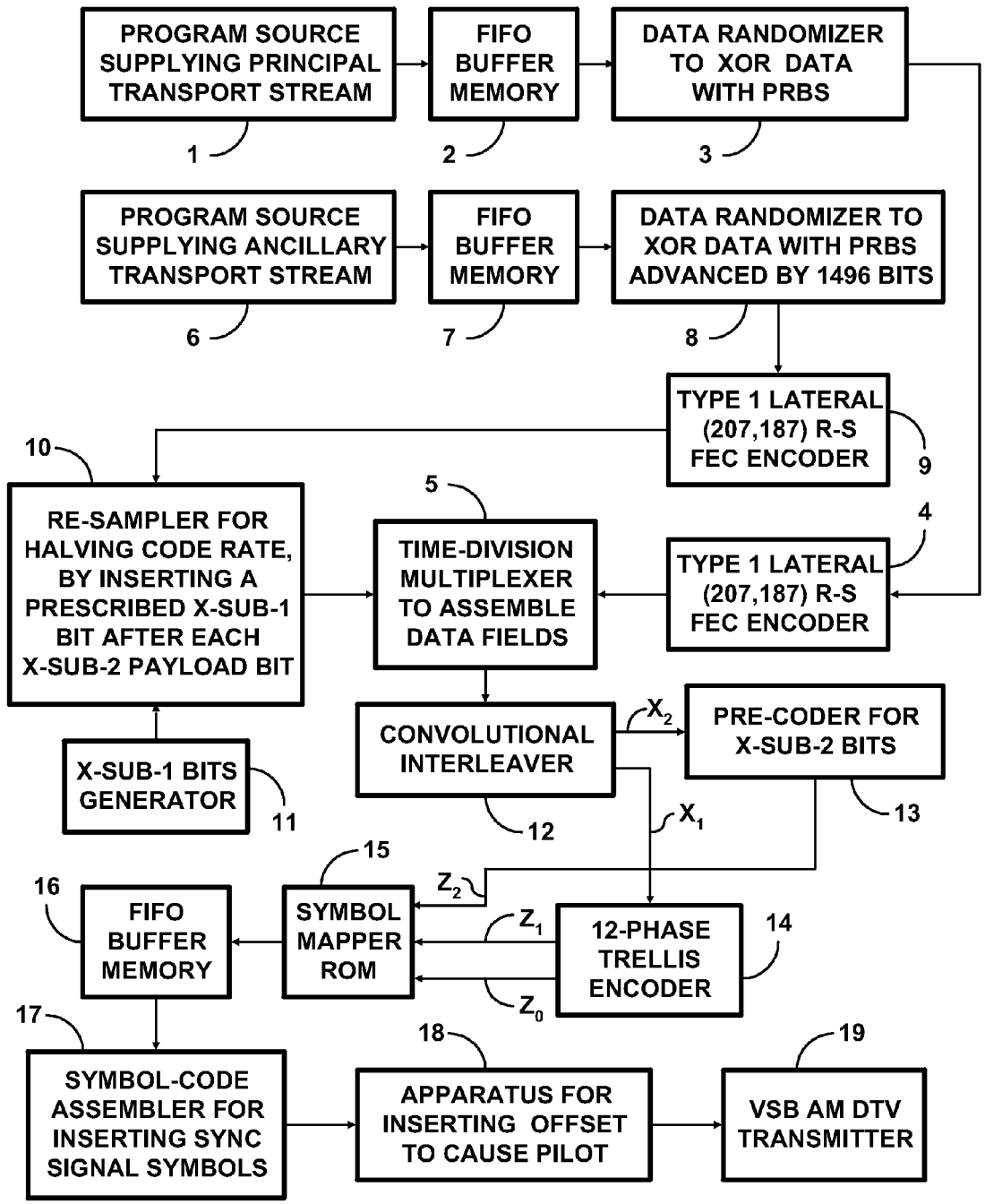
FIG. 1 is a generic schematic diagram of a DTV transmitter constructed in accordance with an aspect of the invention.

FIG. 1 shows a program source 1 of a principal transport stream connected for supplying the successive 187-byte data packets in that transport stream to be written into a first-in/first-out buffer memory 2 for temporary storage therein. A data randomizer 3 is connected for receiving data packets read from the FIFO buffer memory 2 and randomizing the bits in those data packets by exclusive-ORing those bits with the bits of a $2^{16}$-bit maximal length pseudo-random binary sequence (PRBS). The PRBS, which is initialized at the beginning of each data field, is that specified in A/53, Annex D, §§4.2.2 titled "Data randomizer". The portion of the PRBS used in exclusive-ORing each data segment is that portion which is suitable for the location of that data segment in the non-interleaved data field that will be assembled for subsequent lateral (207, 187) R-S FEC coding, convolutional interleaving and trellis coding. A lateral (207, 187) Reed-Solomon forward-error-correction encoder 4 is connected for receiving from the data randomizer 3 the randomized 187-byte data packets of the principal transport stream. The lateral (207, 187) R-S FEC encoder 4 converts these randomized 187-byte data packets to respective 207-byte segments of lateral (207, 187) Reed-Solomon forward-error-correction coding that appends the respective twenty parity bytes of the coding of each randomized 187-byte data packet after the conclusion thereof. The lateral (207, 187) R-S FEC encoder 4 is of a first type, which is conventional in nature; and the practice specified in A/53, Annex D, §§4.2.3 titled "Reed-Solomon encoder" is followed. A time-division multiplexer 5 used to assemble data fields is connected for receiving at a first of its two input ports the 207-byte segments of lateral (207, 187) R-S FEC coding generated by the lateral (207, 187) R-S FEC encoder 4.

FIG. 1 shows a program source 6 of an ancillary transport stream connected for supplying the successive 187-byte data packets in that transport stream to be written into a first-in/first-out buffer memory 7 for temporary storage therein. A data randomizer 8 is connected for receiving data packets read from the FIFO buffer memory 7. The data randomizer 8 is operated for randomizing the bits in those data packets by exclusive-ORing them with the bits of the PRBS 1496 bits (1 data packet) later than for ordinary 8VSB, to compensate for the latency associated with compressing robust data in the DTV receiver. I.e., the portion of the PRBS used for PRBS exclusive-ORing these bits is suitable for the location of the next data segment in the non-interleaved data field. This next data segment can be thought of as a null data segment that is replaced during a subsequent re-sampling procedure for halving code rate. A lateral (207, 187) Reed-Solomon forward-error-correction encoder 9 of conventional first type is connected for receiving from the data randomizer 7 the randomized 187-byte data packets of the ancillary transport stream. The lateral (207, 187) R-S FEC encoder 9 converts these randomized 187-byte data packets to respective 207-byte segments of lateral (207, 187) R-S FEC coding that appends the respective twenty parity bytes of the coding of each randomized 187-byte data packet after the conclusion thereof. A re-sampler 10 is connected for receiving these 207-byte segments from the lateral (207, 187) R-S FEC encoder 9 and generates in response to each of these 207-byte segments a respective pair of 207-byte segments at halved code rate. The re-sampler 10 treats each of these 207-byte segments from the lateral (207, 187) R-S FEC encoder 9 as consisting of the $X_2$ bits utilized in the data stream that the re-sampler 10 supplies to a second of the two input ports of the time-division multiplexer 5. The re-sampler 10 halves the code rate of its response by inserting a respective $X_1$ bit received from an $X_1$ bits generator 11 after each of the $X_2$ bits it receives from the lateral (207, 187) R-S FEC encoder 9.

A convolutional interleaver 12 is connected for receiving the successive data segments of the non-interleaved data field assembled by the time-division multiplexer 5. The convolutional interleaver 12 responds to supply the successive data segments of an interleaved data field using interleaving as prescribed by A/53, Annex D, §§4.2.4 titled "Interleaving". A precoder 13 is connected for receiving the $X_2$ bits of the convolutional interleaver 12 response and generating $Z_2$ bits by adding modulo-2 the $X_2$ bits with those bits from twelve symbol epochs previous. A 12-phase trellis encoder 14 is connected for receiving the $X_1$ bits of the convolutional interleaver 12 response and supplying them as $Z_1$ bits. The trellis encoder 14 is connected for supplying $Z_0$ bits that it generates dependent on previously received $X_1$ bits. A symbol map read-only memory 15 is connected for receiving $Z_2$ bits from the precoder 13 as a portion of its addressing input signal and for receiving the $Z_1$ and $Z_0$ bits from the trellis encoder 14 as the remaining portion of its addressing input signal. The trellis encoder 14, the precoder 13 and the symbol map ROM 15 conform with the 8VSB trellis encoder, precoder and symbol mapper shown in FIG. 7 of A/53, annex D. The precoder 13, the trellis encoder 14 and the symbol map ROM 15 are operated in conformance with A/53, Annex D, §§4.2.5 titled "Trellis coding".

The symbol map ROM 15 operates as a symbol mapper supplying 3-bit, 8-level symbols to a first-in/first-out buffer memory 16. The FIFO buffer memory 16 is operated to provide rate buffering and to open up intervals between 828-symbol groups in the symbol stream supplied to a symbol-code assembler 17, into which intervals the symbol-code assembler 17 inserts synchronizing signal symbols. Each of the successive data fields begins with a respective interval into which the symbol-code assembler 17 inserts symbol code descriptive of a data-segment-synchronization (DSS) sequence followed by symbol code descriptive of an initial data segment including an appropriate data-field-synchronization (DFS) sequence. Each data segment in the respective remainder of each data field is followed by a respective interval into which the symbol-code assembler 17 inserts symbol code descriptive of a respective DSS sequence. Apparatus 18 for inserting the offset to cause pilot is connected to receive assembled data fields from the symbol-code assembler 17. The apparatus 18 is simply a clocked digital adder that zero extends the number used as symbol code and adds a constant term thereto to generate a real-only modulating signal in digital form, supplied to a vestigial-sideband amplitude-modulation digital television transmitter 19 of conventional construction.

Figures 2, 3:
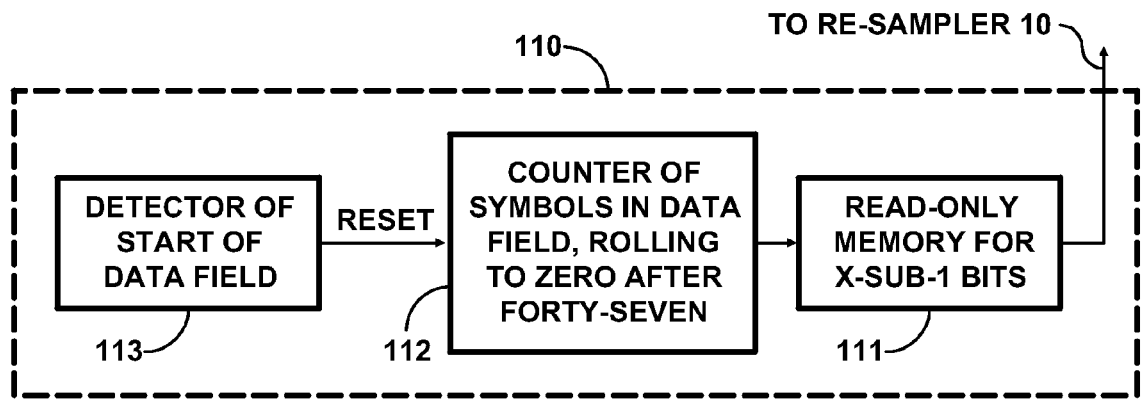
FIG. 2 is a schematic diagram showing one particular construction of the $X_1$ bits generator for the FIG. 1 DTV transmitter.
FIG. 3 is a table showing a possible set of $X_1$ bits stored in read-only memory included in the $X_1$ bits generator of FIG. 2.

FIG. 2 shows one particular construction 110 of the $X_1$ bits generator 11 for the FIG. 1 DTV transmitter. A read-only memory 111 responds to input addressing received from a symbol counter 112 to supply $X_1$ bits to the re-sampler 10 in the FIG. 1 DTV transmitter. FIG. 3 is a table showing a possible set of $X_1$ bits stored in the ROM 111. The symbol counter 112 is of a type supplying consecutive counts zero through forty-seven and rolling back to zero count after forty-seven count. If the trellis encoder 14 receives $X_1$ bits that change value every second $X_1$ bit for each of the twelve trellis coding phases, the trellis encoder 14 generates all four types of $Z_1$, $Z_0$ pairs in substantially the same number over a long enough period of time. By staggering the way the $X_1$ repeats occur in the twelve trellis coding phases, the length of this period of time can be shortened some.

However, there is a preference that each grouping of the halved-code-rate signal in the convolutional interleaver 12 response contains 48 or a multiple of 48 successive symbols. This can be achieved most of the time by grouping the halved-code-rate signal in the time-division multiplexer 5 response so it occurs in bands of twelve contiguous data segments.

Since the $X_2$ bits are randomized, the $Z_2$ bits supplied from the precoder 13 are also randomized. The randomized nature of the $Z_2$ bits, all four types of $Z_1$, $Z_0$ pairs occurring in substantially the same number over a period of time, and the independence of the $Z_2$ and $Z_1$ bits cause the eight 8VSB symbols to occur substantially as often as each other in the robust modulation. Accordingly, the ratio of peak power to average power in the robust modulation generated in response to the particular construction 110 of the $X_1$ bits generator 11 is substantially the same as in normal 8VSB modulation.

FIG. 2 shows a detector 113 of the start of the data field connected to supply the symbol counter 112 with a reset pulse at the beginning of each data field, which reset pulse resets the count to 0000000. A typical construction for the detector 113 includes a match filter for generating a pulse response to the PN511 sequence in the initial data segment of the data field DFS. The typical construction for the detector 113 further includes a clocked digital delay line for delaying that pulse response to provide the reset pulse to the symbol counter 112 to reset it to the 0000000 count at the beginning of the actual data field, exclusive of synchronizing signals.

Figure 4:
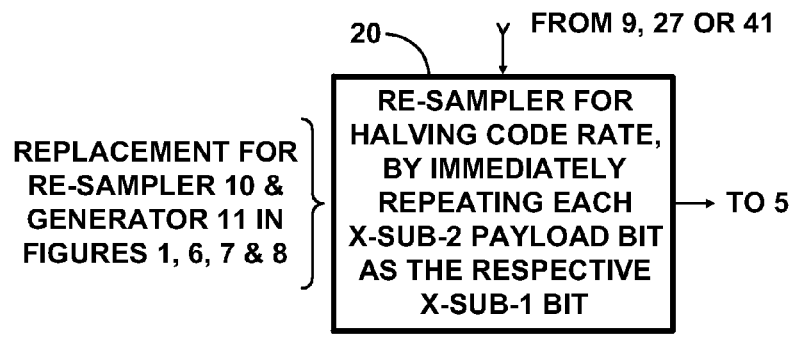
FIG. 4 is a schematic diagram of a modification that can be made to the DTV transmitter of FIG. 1, 6, 7 or 8 to provide for the transmission of 8VSB and pseudo-2VSB signals in time-division multiplex.

FIG. 4 shows a modification that can be made to the FIG. 1 DTV transmitter that provides for the transmission of 8VSB and pseudo-2VSB signals in time-division multiplex. The re-sampler 10 and the $X_1$ bits generator 11 of the FIG. 1 DTV transmitter are replaced by a re-sampler 20. The re-sampler 20 halves code rate in the data stream it supplies to the time-division multiplexer 5 used to assemble data fields. The re-sampler 20 halves code rate by immediately repeating each $X_2$ bit, thereby generating a respective $X_1$ bit. The pre-coder 13, the trellis encoder 14 and the symbol map ROM 15 convert each of the resulting bit pairs to a respective pseudo-2VSB symbol.

Figure 5:
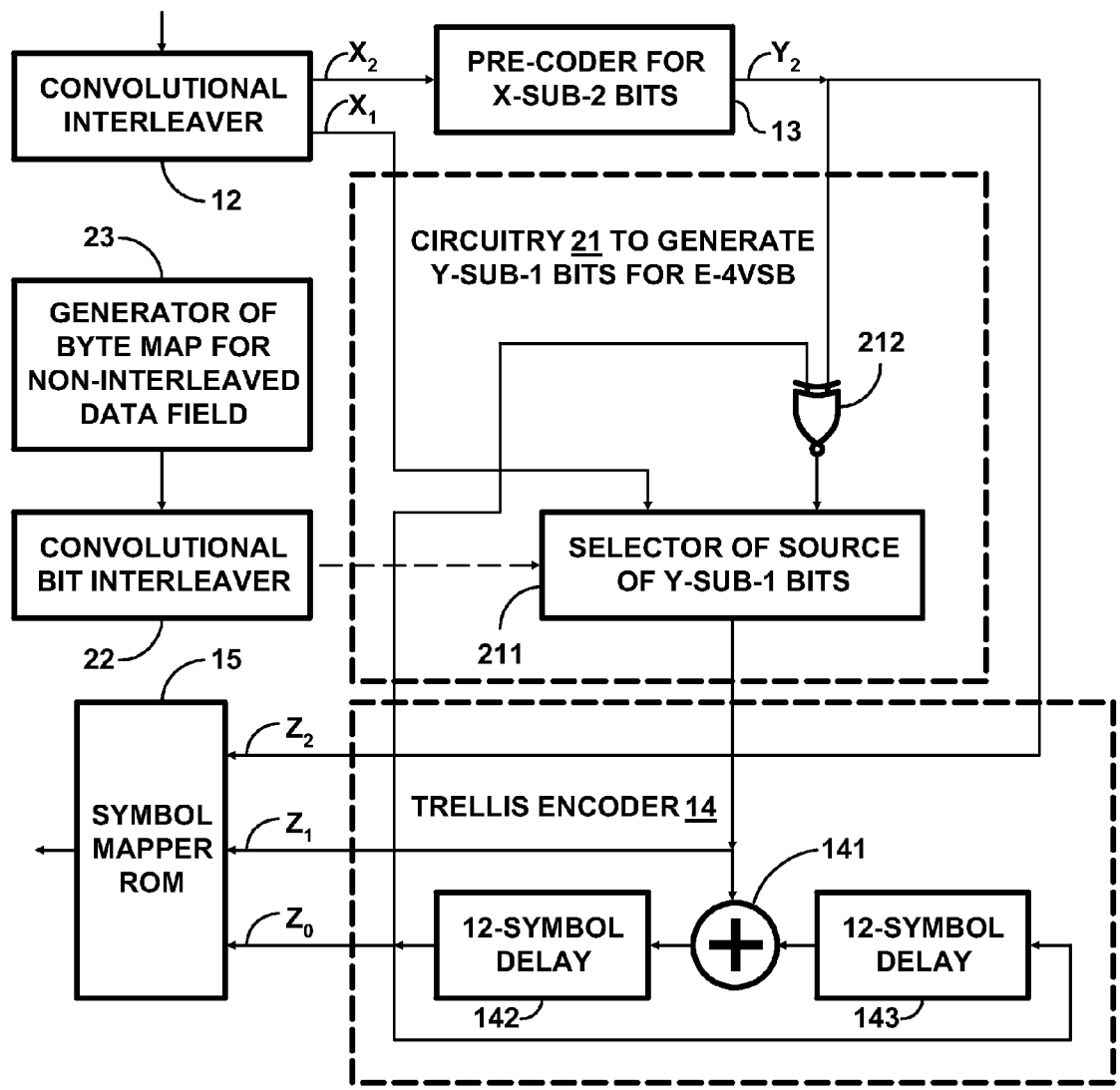
FIG. 5 is a schematic diagram of a modification that can be made to the DTV transmitter of FIG. 1, 6, 7 or 8 to provide for the transmission of 8VSB and enhanced-4VSB signals in time-division multiplex.

FIG. 5 shows a modification of the FIG. 1 DTV transmitter that provides for the transmission of enhanced-4VSB signal in time-division multiplex with normal 8VSB signal. Circuitry 21 to generate the $Y_1$ bits for E-4VSB is interposed between the convolutional interleaver 12 and the trellis encoder 14. A selector 211 of the source of $Y_1$ bits is connected for supplying $Y_1$ bits to the trellis encoder 14. When a normal 8VSB symbol is to be transmitted, the selector 211 generates the $Y_1$ bit by reproducing the $X_1$ bit from the convolutional interleaver 12 response. Whenever an E-4VSB symbol is to be transmitted, the selector 211 generates the $Y_1$ bit by reproducing the response from an exclusive-NOR gate 212. The exclusive-NOR gate 212 is connected for receiving each successive $Y_2$ bit from the precoder 13 at one of its two input ports and for receiving each successive $Z_0$ bit from the trellis encoder 14 at the other of its two input ports. The $Y_2$ bit from the precoder 13 corresponds to the $Z_2$ bit from the trellis encoder 14, so effectively the $Z_1$ bit of each E-4VSB symbol that is to be transmitted is the exclusive-NOR gate 212 response to its $Z_2$ and $Z_0$ bits. If the $Z_2$ and $Z_0$ bits of the E-4VSB symbol are ZERO and ONE, respectively, the E-4VSB symbol must have a −5 symbol code with a $Z_1$ bit that is a ZERO. If the $Z_2$ and $Z_0$ bits of the E-4VSB symbol are both ZEROes, the E-4VSB symbol must have a −3 symbol code with a $Z_1$ bit that is a ONE. If the $Z_2$ and $Z_0$ bits of the E-4VSB symbol are ONE and ZERO, respectively, the E-4VSB symbol must have a +1 symbol code with a $Z_1$ bit that is a ZERO. If the $Z_2$ and $Z_0$ bits of the E-4VSB symbol are both ONEs, the E-4VSB symbol must have a +7 symbol code with a $Z_1$ bit that is a ONE.

FIG. 5 shows a convolutional bit interleaver 22 connected for supplying the control signal for the selector 211. The convolutional bit interleaver 22 is connected for receiving bits that map the position of bytes in the non-interleaved data field from a generator 23 of such a byte map. Bytes in data segments that are to be transmitted with ordinary 8VSB symbols are coded with one of the bit values ZERO and ONE. Bytes in data segments that are to be transmitted with E-4VSB symbols are coded with the other of the bit values ZERO and ONE. In its response the convolutional bit interleaver 22 interleaves the bits the generator 23 supplies analogously to the way that the convolutional interleaver 12 interleaves bytes of the non-interleaved data field in its response. Accordingly, the convolutional bit interleaver 22 generates bits of control signal for the selector 211 that map the position of bytes in the interleaved data field supplied from the convolutional interleaver 12. The bits of this control signal for the selector 211 indicate whether the symbols extracted from that byte are to be ordinary 8VSB symbols or are to be E-4VSB symbols instead.

Figure 6:
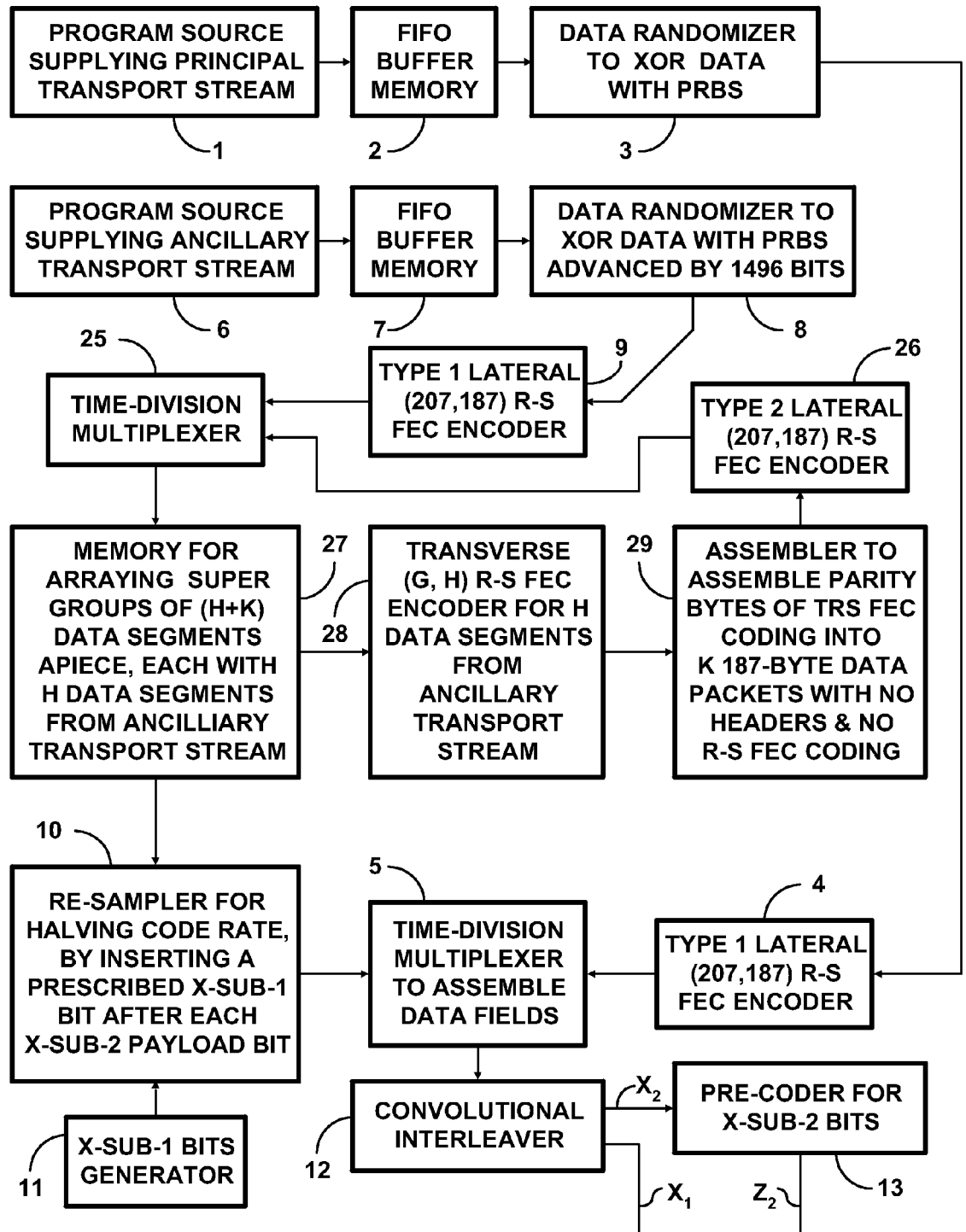
FIG. 6 is a schematic diagram of a modification of the FIG. 1 DTV transmitter that in accordance with an aspect of the invention provides transverse Reed-Solomon forward-error-correction coding to data for an ancillary service transmitted using a restricted alphabet of 8VSB symbols.

FIG. 6 shows a modification of the FIG. 1 DTV transmitter in which data packets in the ancillary transport stream are provided transverse Reed-Solomon forward-error-correction coding. A time-division multiplexer 25 has a first input port connected for receiving 207-byte data segments from the lateral (207, 187) R-S FEC encoder 9 of a first type. The time-division multiplexer 25 has a second input port connected for receiving 207-byte data segments from a lateral (207, 187) R-S FEC encoder 26 of a second type. The time-division multiplexer 25 has an output port at which 207-byte data segments from the R-S FEC encoders 9 and 26 are reproduced, connected for supplying these data segments to a random-access memory 27 for being written to one of two banks therein. The RAM 27 stores one 8-bit byte of code plus any byte extensions at each of its addressed storage locations. The RAM 27 has enough addressed storage locations to store at least two successive supergroups of (H+K) 207-byte data segments apiece.

After H successive ancillary-service data packets have been written into a bank of the RAM 27, read addressing is applied to this bank This read addressing scans these H successive data segments in transverse direction to read H-byte transverse data segments to a transverse (G, H) Reed-Solomon forward-error-correction encoder 28. A data assembler 29 assembles the parity bytes generated by the transverse R-S FEC encoder 28 into K 187-byte packets with no headers. The data assembler 29 supplies each of these K packets to the lateral (207, 187) R-S FEC encoder 26 of second type to generate a respective one of K 207-byte data segments. The time-division multiplexer 25 reproduces these K data segments for being written into a bank of the RAM 27 to complete the supergroup that is temporarily stored therein. The (H+K) data segments in this completed supergroup are then read seriatim from that bank of the RAM 27 to the re-sampler 10 at appropriate intervals.

Preferably, the K data segments containing parity bytes from transverse R-S FEC coding are read from the RAM 27 before the H data segments containing the payload data selected for robust transmission. This procedure enables (or helps) a DTV receiver of new design to determine when the earliest of a supergroup of (H+K) data segments is received. This is important because the supergroups of (H+K) data segments are formed from selected ones of successive data segments, which selected data segments are scattered through one or more data fields. The supergroups of (H+K) data segments need not have defined boundaries respective to data fields as defined in A/53. A DTV receiver of new design can determine that lateral (207, 187) R-S FEC coding of second type is used in each of the K segments that contain parity bytes from transverse R-S FEC coding with correctable byte errors. A DTV receiver of new design can also determine the type of lateral (207, 187) R-S FEC coding used in ones of these K segments that contain parity bytes from transverse R-S FEC coding with no greater a number of byte errors than twice the number of correctable byte errors. A determination that lateral (207, 187) R-S FEC coding of second type is used in a data segment conditions the DTV receiver to temporarily store the data segment in a bank of memory for a supergroup of (H+K) data segments. The DTV receiver is further conditioned to select subsequent data segments of the same supergroup also to be temporarily stored in that bank of memory. The DTV receiver then proceeds to perform transverse R-S FEC decoding of the supergroup of (H+K) data segments. The type of lateral (207, 187) R-S FEC coding used in the K data segments containing parity bytes from transverse R-S FEC coding can specify the type of H data segments that should be selected for temporary storage in the supergroup of (H+K) data segments. These H data segments are identified by the PIDs in their headers, and the continuity counts in the headers can be used for determining when the supergroup of (H+K) data segments temporarily stored in a bank of memory is completed.

The R-S FEC coding used by the lateral (207, 187) R-S FEC encoder 26 of second type is shortened differently than the R-S FEC coding used by the lateral (207, 187) R-S FEC encoder 9 of first type. The first type of (207, 187) R-S FEC coding is that implicitly specified in A/53 and is presumably shortened from a (255, 235) R-S FEC code using forty-eight virtual bytes that are all 0000 0000. Other types of (207, 187) R-S FEC coding can be generated by modifying at least ten selected bytes of its R-S FEC coding in a prescribed way, such as one's complementing each bit in the selected bytes. Alternatively, other types of (207, 187) R-S FEC coding can be generated using different sets of virtual bytes that are not all 0000 0000. Such modifications of R-S FEC coding are described in more detail in U.S. patent application Ser. No. 10/885,460 filed 6 Jul. 2004 for Allen LeRoy Limberg and titled "Reed-Solomon Coding Modifications for Signaling Transmission of Different Types of Data Packets".

The FIG. 6 DTV transmitter can be modified to provide for the transmission of 8VSB and pseudo-2VSB signals in time-division multiplex. The lateral (207, 187) R-S FEC encoder 26 of second type is replaced by a lateral (207, 187) R-S FEC encoder 26 of third type, which identifies those data segments used for pseudo-2VSB transmission. The re-sampler 10 and the $X_1$ bits generator 11 of the FIG. 6 DTV transmitter are replaced by the re-sampler 20 of FIG. 4. The re-sampler 20 halves code rate in the data stream it supplies to the time-division multiplier 5 used to assemble data fields.

Figure 7:
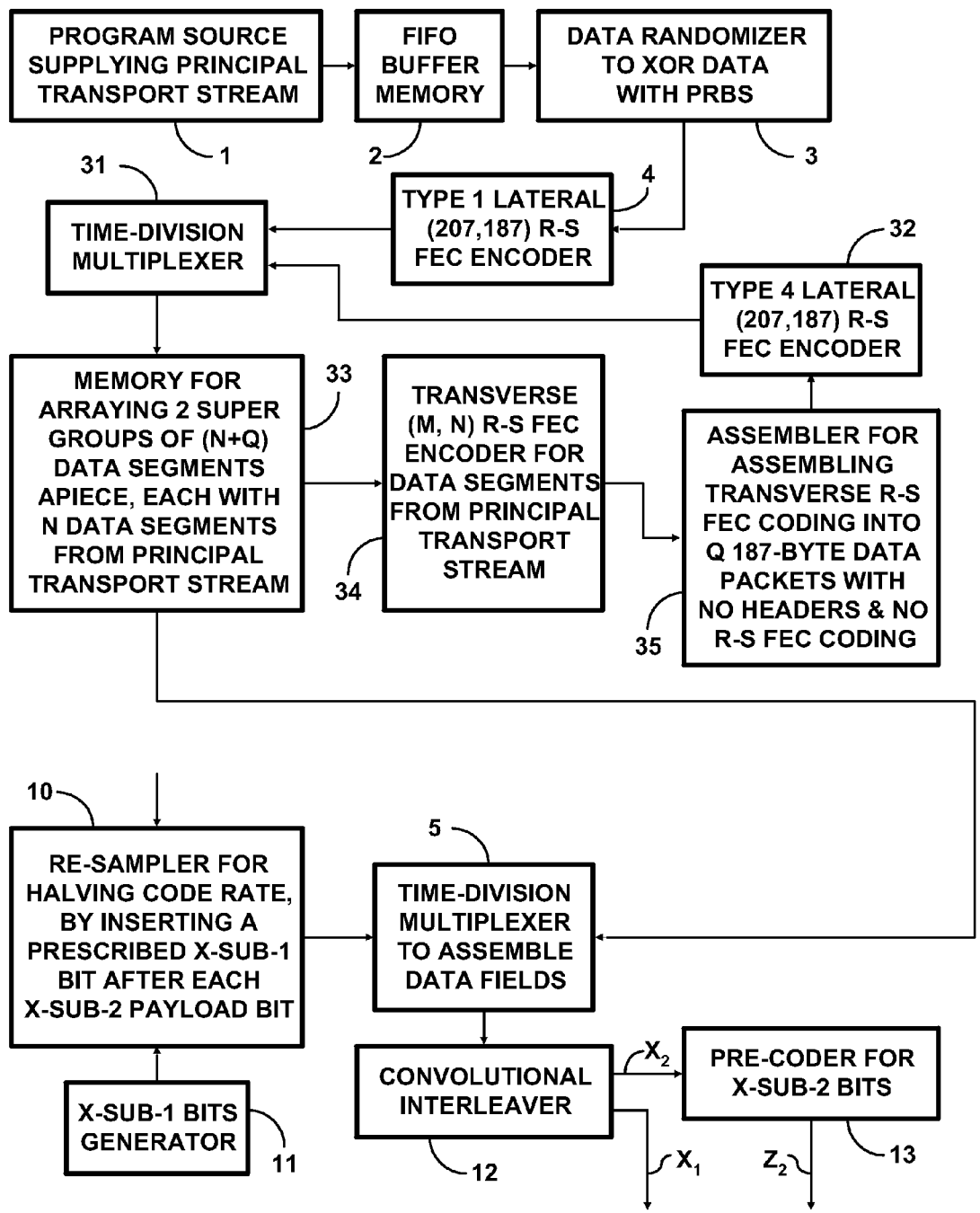
FIG. 7 is a schematic diagram of another modification of the FIG. 1 DTV transmitter, which modification provides transverse Reed-Solomon forward-error-correction coding to data transmitted using the full alphabet of 8VSB symbols.

FIG. 7 shows another modification that can be made to the FIG. 1 DTV transmitter, which modification provides transverse R-S FEC coding to data transmitted using the full alphabet of 8VSB symbols. A time-division multiplexer 31 has a first input port connected for receiving 207-byte data segments from the lateral (207, 187) R-S FEC encoder 4 of first type. The time-division multiplexer 31 has a second input port connected for receiving 207-byte data segments from a lateral (207, 187) R-S FEC encoder 32 of a fourth type. The time-division multiplexer 31 has an output port at which 207-byte data segments from the R-S FEC encoders 4 and 32 are reproduced. This output port is connected for supplying these data segments to a random-access memory 33 for being written to one of two banks therein. The RAM 33 stores one 8-bit byte of code plus any byte extensions at each of its addressed storage locations. The RAM 33 has enough addressed storage locations to store at least two successive supergroups of (N+Q) 207-byte data segments apiece. (N+Q) is presumed to be 156 or a multiple thereof, which simplifies keeping track of the phasing of data randomization in the DTV transmitter and in DTV receivers.

After N successive data segments have been written into a bank of the RAM 33, read addressing is applied to this bank This read addressing scans these N successive data segments in transverse direction to read H-byte transverse data segments to a transverse (M, N) Reed-Solomon forward-error-correction encoder 34. A data assembler 35 assembles the parity bytes generated by the transverse R-S FEC encoder 34 into Q 187-byte data packets with no headers. The data assembler 35 supplies each of these Q packets to the lateral (207, 187) R-S FEC encoder 32 of fourth type to generate a respective one of Q 207-byte data segments. The time-division multiplexer 31 reproduces these Q data segments for being written into a bank of the RAM 33 to complete the supergroup that is temporarily stored therein. The (N+Q) 207-byte data segments in this completed supergroup are then read seriatim from that bank of the RAM 33 to the first input port of the time-division multiplexer 5 at appropriate intervals. The second input port of the time-division multiplexer 5 is connected to receive 207-byte data segments from the re-sampler 10.

Generally, it is preferable that the Q data segments containing parity bytes from transverse R-S FEC coding are read from the RAM 33 after the N data segments containing the payload data selected for transverse R-S FEC coding. In many instances the transversal R-S FEC coding over supergroups of (N+Q) data segments involves more transverse paths than there are bytes in a packet assembled by the data assembler 35, so there is a progressive skew in the transverse paths as they traverse the correction field. If transversal R-S FEC coding is done on the parity bytes of the lateral (207, 187) R-S FEC coding of data segments in the information field, for example, there will be 207 transverse paths. Each successive set of 207 parity bytes will occupy more than the 187 bytes available in each data packet assembled by the data assembler 35, and so will have to be assembled within two consecutive data packets. The distance between bytes in the same transverse path is lengthened when crossing from the information field into the correction field if the Q data segments containing transverse R-S FEC coding are read from the RAM 33 after the N data segments containing the payload data. If the Q data segments containing transverse R-S FEC coding are read from the RAM 33 before the N data segments containing the payload data, the distance between bytes in the same transverse path is shortened when crossing from the information field into the correction field. This impairs the capability to withstand certain burst errors. Since all data segments except those containing DFS are contained in successive (N+Q) supergroups, a DTV receiver of new design temporarily stores all data segments in memory for possible transverse R-S FEC decoding. This is automatic. The DTV receiver of new design does not need to be prompted to this action responsive to information identifying the type of transverse R-S FEC coding included in the Q segments containing parity bytes from transverse R-S FEC code. So, there is no need to position these Q segments at the beginning of the supergroup.

The FIG. 7 DTV transmitter can be modified to provide for the transmission of 8VSB and pseudo-2VSB signals in time-division multiplex. In the modified FIG. 7 DTV transmitter the re-sampler 20 of FIG. 4 replaces the re-sampler 10 and the $X_1$ bits generator 11.

Figure 8:
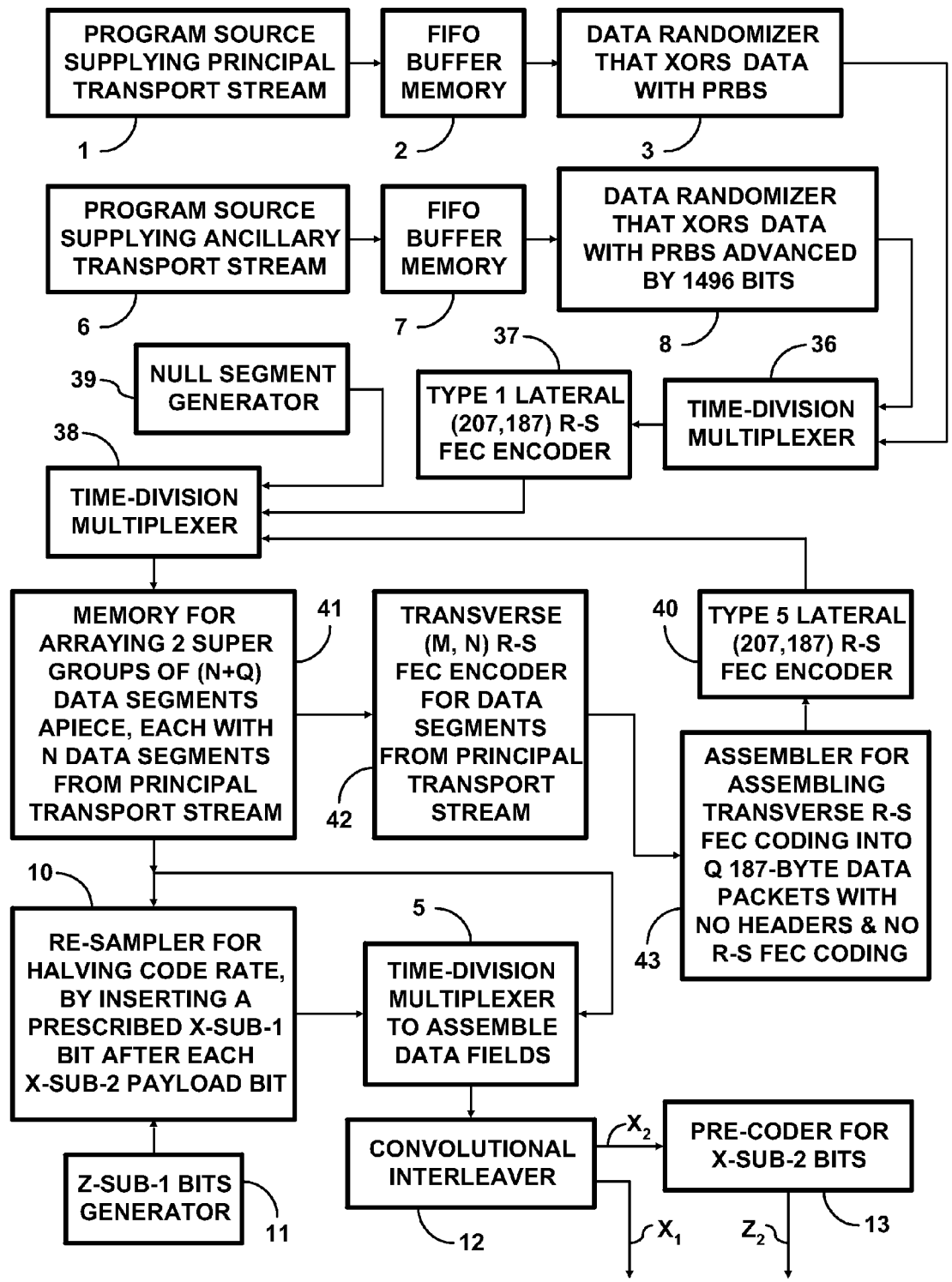
FIG. 8 is a schematic diagram of an alternative modification of the FIG. 1 DTV transmitter, which modification provides transverse R-S FEC coding both to data subsequently transmitted using the full alphabet of 8VSB symbols and to data subsequently transmitted using a restricted alphabet of 8VSB symbols.

FIG. 8 shows a further modification of the FIG. 1 DTV transmitter, which modification provides transverse R-S FEC coding to data subsequently transmitted using a restricted alphabet of 8VSB symbols as well as to data subsequently transmitted using the full alphabet of 8VSB symbols. The program source 1 of a principal transport stream is connected for writing data packets to the FIFO buffer memory 2 for temporary storage therein. The data randomizer 3 is connected for receiving data packets read from the FIFO buffer memory 2 and randomizing the bits in those data packets. The program source 6 of an ancillary transport stream is connected for writing data packets to the FIFO buffer memory 7 for temporary storage therein. The data randomizer 8 is connected for receiving data packets read from the FIFO buffer memory 7 and randomizing the bits in those data packets. A first input port of a time-division multiplexer 36 is connected to receive randomized data packets from the data randomizer 3, and the second input port of the multiplexer 36 is connected to receive randomized data packets from the data randomizer 8. The multiplexer 36 reproduces these 187-byte randomized data packets in a time-division multiplexed response supplied from the output port of the multiplexer 36 to the input port of a lateral (207, 187) R-S FEC encoder 37 of the first type. The lateral (207, 187) R-S FEC encoder 37 converts these randomized 187-byte data packets to respective 207-byte segments of lateral (207, 187) Reed-Solomon forward-error-correction coding that appends the respective twenty parity bytes of the coding of each randomized 187-byte data packet after the conclusion thereof. This complies with the practice specified in A/53, Annex D, §§4.2.3 titled "Reed-Solomon encoder.

A first input port of a time-division multiplexer 38 is connected to receive the 207-byte segments of lateral (207, 187) R-S FEC coding generated by the lateral (207, 187) R-S FEC encoder 37. A second input port of the time-division multiplexer 38 is connected to receive 207-byte segments of nulls generated by a null segment generator 39. The null segment generator 39 continuously generates 207-byte segments of null bytes. The time-division multiplexer 38 is operated so that one of these segments of null bytes is reproduced in its response immediately before each 207-byte segment supplied from the lateral (207, 187) R-S FEC encoder 37 is reproduced. A third input port of the time-division multiplexer 38 is connected to receive 207-byte segments of lateral (207, 187) R-S FEC coding generated by a lateral (207, 187) R-S FEC encoder 40 of fifth type.

A random-access memory 41 is connected to an output port of the time-division multiplexer 38, which supplies 207-byte data segments for being written to one of two banks of memory in the RAM 41. The RAM 41 stores one 8-bit byte of code plus any byte extensions at each of its addressed storage locations. The RAM 41 has enough addressed storage locations to store at least two successive supergroups of (N+Q) 207-byte data segments apiece.

After N successive data segments have been written into a bank of the RAM 41, read addressing is applied to this bank This read addressing scans these N successive data segments in transverse direction to read H-byte transverse data segments to a transverse (M, N) Reed-Solomon forward-error-correction encoder 42. A data assembler 43 assembles the parity bytes generated by the transverse R-S FEC encoder 42 into Q 187-byte data packets with no headers. The data assembler 43 supplies each of these Q packets to the lateral (207, 187) R-S FEC encoder 40 of fourth type to generate a respective one of Q 207-byte data segments. The time-division multiplexer 38 reproduces these Q data segments for being written into a bank of the RAM 41 to complete the supergroup that is temporarily stored therein.

After transverse R-S FEC coding is completed, the (N+Q) data segments in each completed supergroup are read in prescribed order from the RAM 34 to the re-sampler 10, as well as to the first input port of the time-division multiplexer 5. This prescribed order of reading is generally serial in character, but reverses the order in which a null data segment and the immediately succeeding data segment in the supergroup are read from the RAM 34 as a pair of successive data segments. The immediately succeeding data segment is read from the RAM 34 one data segment interval early, so the pair of data segments generated by the re-sampler 10 is timed so as to be able to replace the pair of successive data segments read from the RAM 34. The time-division multiplexer 5 assembles data fields by time-division multiplexing pairs of data segments received from the re-sampler 10 with selected ones of the data segments read from the RAM 34.

The FIG. 8 DTV transmitter can be modified to provide for the transmission of 8VSB and pseudo-2VSB signals in time-division multiplex. In the modified FIG. 8 DTV transmitter the re-sampler 20 of FIG. 4 replaces the re-sampler 10 and the $X_1$ bits generator 11.

Figure 9A:
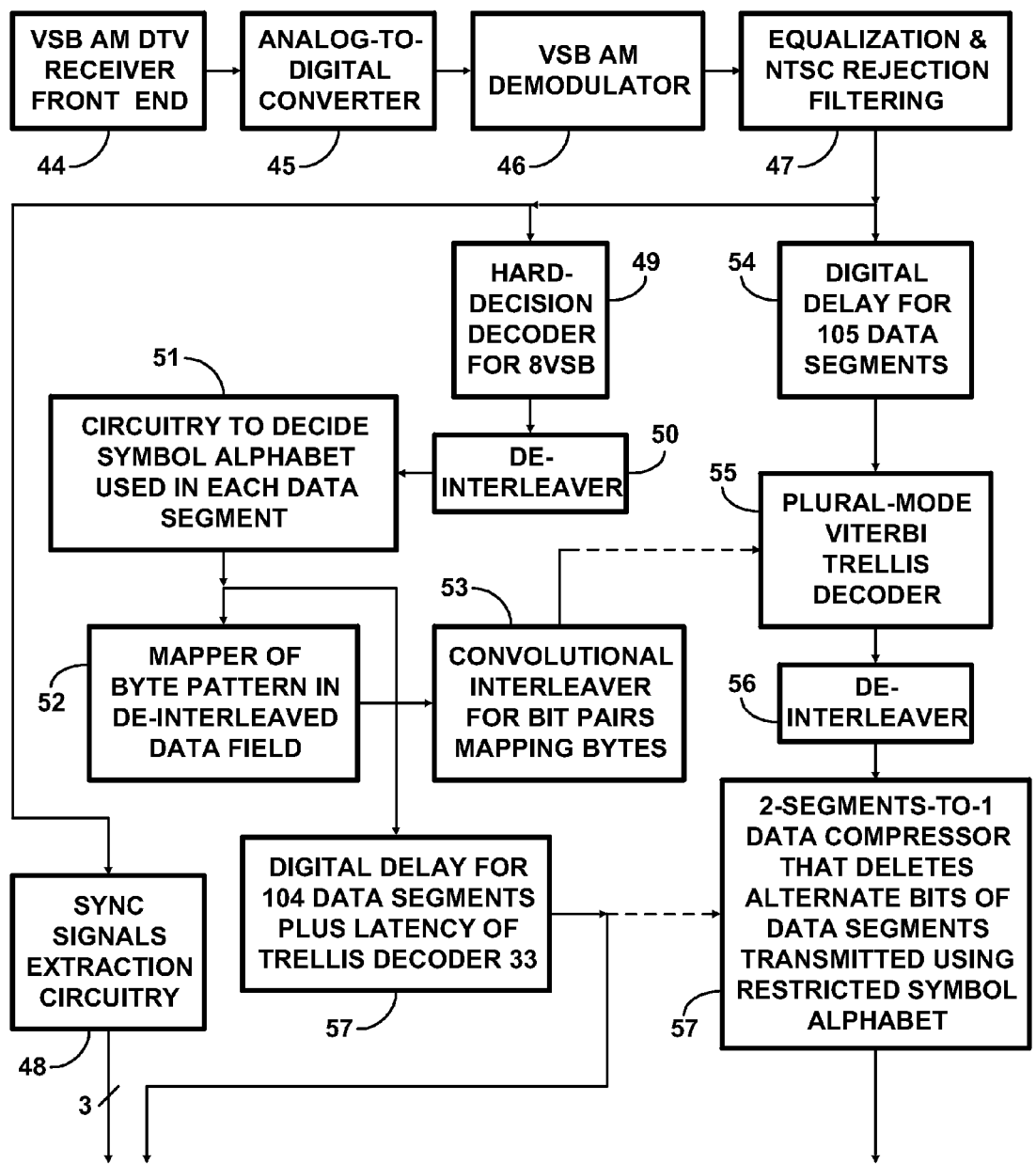
FIGS. 9A, 9B and 9C combine to form a FIG. 9 schematic diagram of a DTV receiver capable of receiving DTV signals as transmitted by the FIG. 1 DTV transmitter or modifications of that transmitter per any of FIGS. 4, 5, 6, 7 and 8.
Figure 9B:
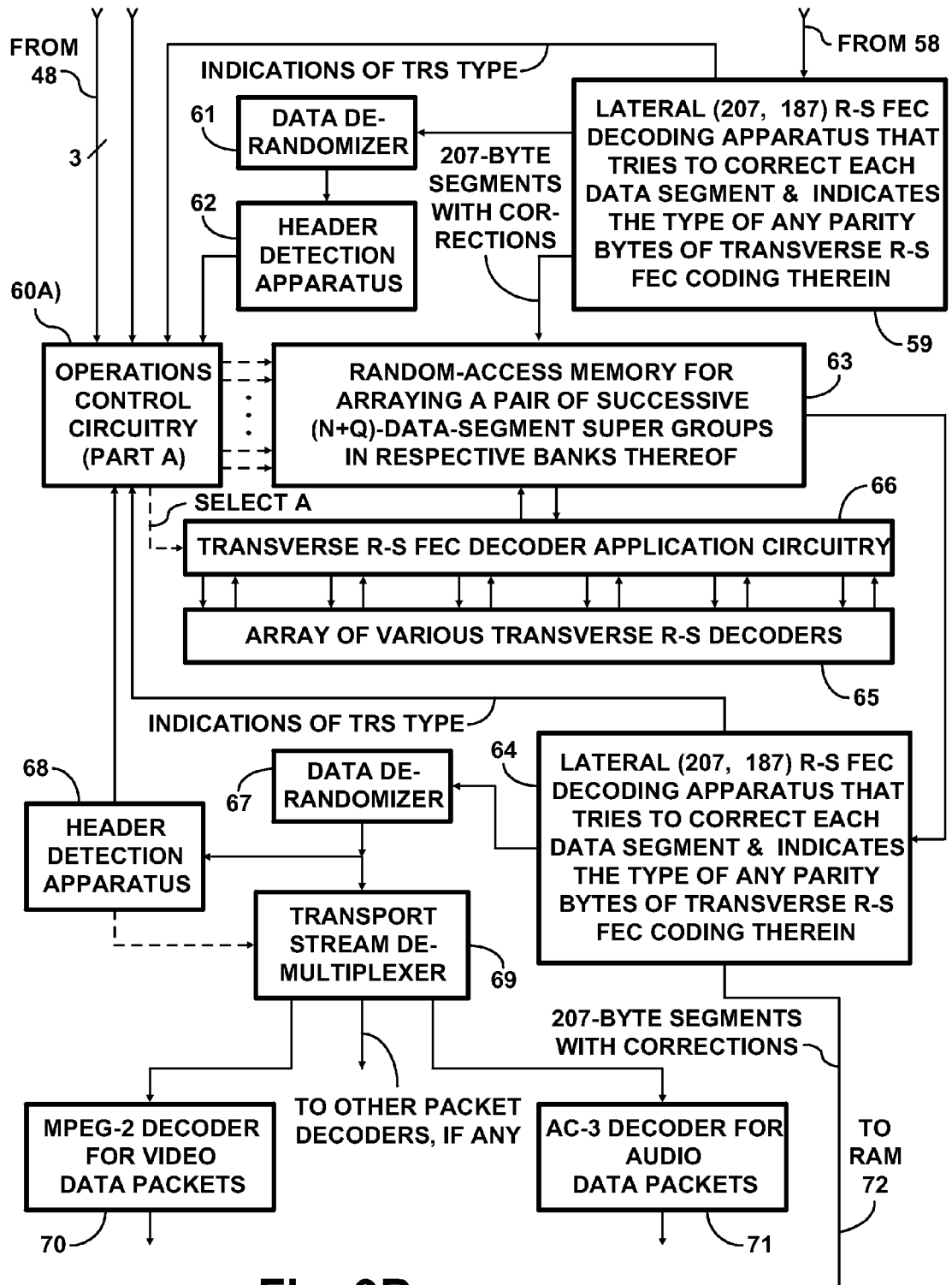
Figure 9C:
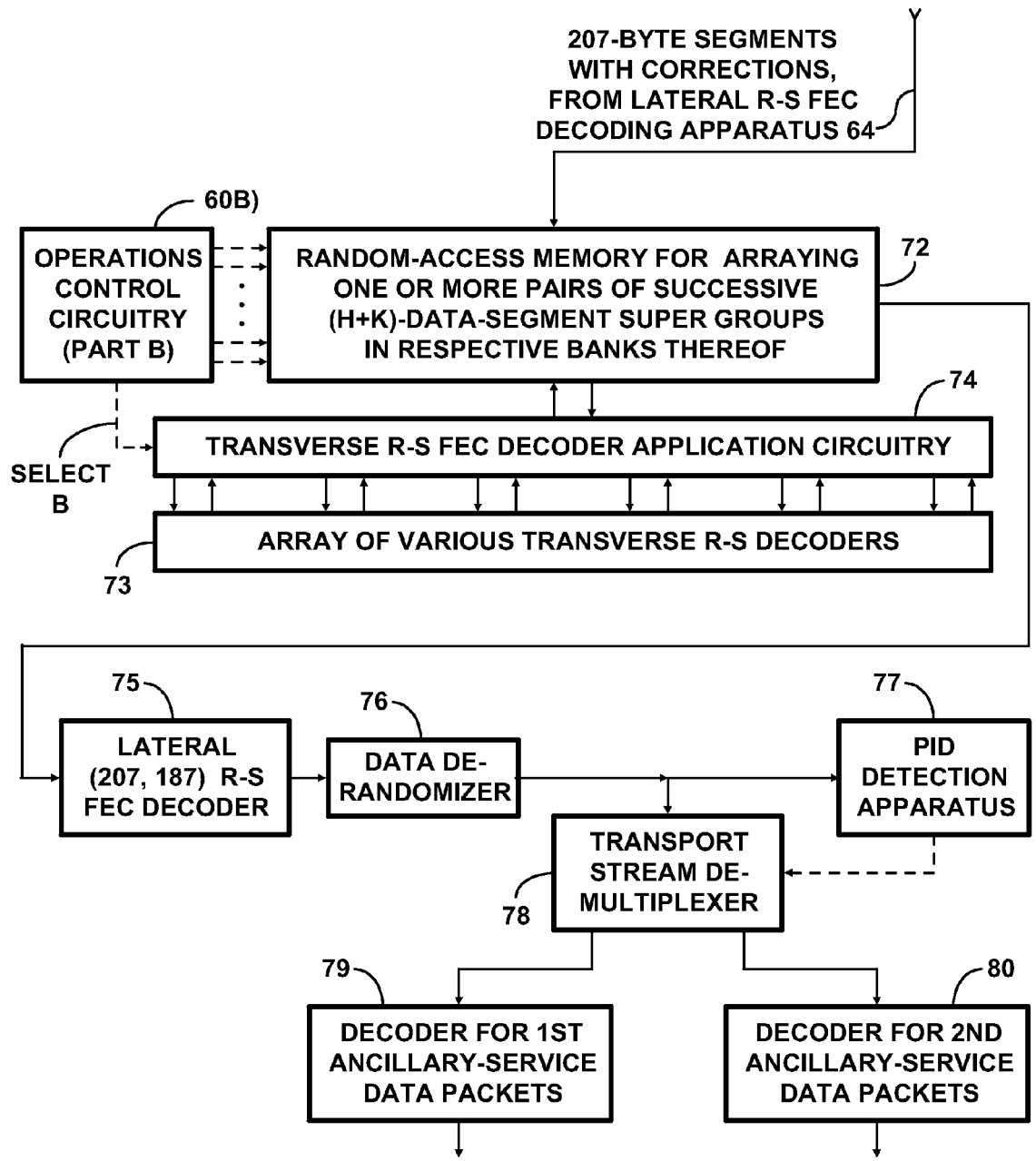

FIGS. 9A, 9B and 9C combine to form a FIG. 9 schematic diagram of a DTV receiver capable of receiving DTV signals as transmitted by the DTV transmitters described supra. The FIG. 9A portion of the DTV receiver includes a vestigial-sideband amplitude-modulation (VSB AM) DTV receiver front-end 44 for selecting a radio-frequency DTV signal for reception, converting the selected RF DTV signal to an intermediate-frequency DTV signal, and for amplifying the IF DTV signal. An analog-to-digital converter 45 is connected for digitizing the amplified IF DTV signal supplied from the DTV receiver front-end 44. A demodulator 46 is connected for demodulating the digitized VSB AM IF DTV signal to generate a digitized baseband DTV signal, which is supplied to digital filtering 47 for equalization of channel response and for rejection of co-channel interfering NTSC signal. Synchronization signals extraction circuitry 48 is connected for receiving the digital filtering 47 response. Responsive to data-field-synchronization (DFS) signals, the sync signals extraction circuitry 48 detects the beginnings of data frames and fields. Responsive to data-segment-synchronization (DSS) signals, the sync signals extraction circuitry 48 detects the beginnings of data segments.

FIG. 9A shows circuitry for analyzing the symbol alphabet used in various portions of the reproduced baseband DTV signal. This circuitry includes a hard-decision decoder 49 for 8VSB symbols, which is connected for receiving the response of the digital filtering 47 for equalization of channel response and for rejection of co-channel interfering NTSC signal. The decisions that the decoder 49 makes concerning the 3-bit symbols are supplied to a de-interleaver 50 that complements the convolutional interleaver 12 in the DTV transmitter. However, the de-interleaver 50 operates with 12-bit bytes, rather than standard 8-bit bytes, and supplies symbol code to circuitry 51 to decide the symbol alphabet used in each data segment. The circuitry 51 decides the symbol alphabet used in each data segment by evaluating the distribution of 8VSB symbols used in each data segment, which procedures are described in more detail further on in this specification. Assuming that besides the full 8VSB alphabet two or three restricted alphabets are used, the decisions that the circuitry 51 supplies are expressed as bit pairs. E.g., 00 indicates full 8VSB alphabet; 01 indicates pseudo-2VSB; 10 indicates E-4VSB; 11 indicates a restricted alphabet that selects between two groups of possible symbols. The first group of possible symbols consists of symbols with −7, −5, +1 and +3 normalized modulation levels. The second group of possible symbols consists of symbols with −3, −1, +5 and +7 normalized modulation levels.

The circuitry 51 can determine in the following way whether or not a data segment is transmitted using pseudo-2VSB. The de-interleaver 50 supplies the circuitry 51 with a succession of 3-bit symbol codes. The $Z_2$ and $Z_1$ bits of these symbol codes are applied to respective input ports of a first two-input exclusive-NOR gate, which responds with a ONE to all symbols included in the pseudo-2VSB set and with a ZERO to all symbols excluded from the pseudo-2VSB set. The ONEs that the first exclusive-NOR gate generates in the 828 symbol epochs of each data segment are counted. The count is compared to a prescribed threshold value, such as 777. If this threshold is exceeded, this is an indication that the data segment was transmitted using pseudo-2VSB. This indication conditions a first pair of tri-states to assert the 01 bit pair from low source impedances on the output lines from the circuitry 51.

The circuitry 51 can determine in the following way whether or not a data segment is transmitted using E-4VSB of the sort proposed by ETRI/CNU. The 3-bit symbol codes that the de-interleaver 50 supplies are supplied to a set of eight decoders, each responding with a ONE when and only when a respective one of the eight 3-bit symbol codes occurs. The responses of the decoders for 001, 010, 100 and 111 symbol codes are applied to respective input ports of a 4-input OR gate. The ONEs that the 4-input OR gate generates in the 828 symbol epochs of each data segment are counted. The count is compared to a prescribed threshold value, such as 777. If this threshold is exceeded, this is an indication that the data segment was transmitted using E-4VSB of the sort proposed by ETRI/CNU. This indication conditions a second pair of tri-states to assert the 10 bit pair from low source impedances on the output lines from the circuitry 51.

The circuitry 51 can determine in the following way whether or not a data segment is transmitted using symbols with a predetermined sequence of $Z_1$ bits. The $Z_1$ bits of the 3-bit symbol codes that the de-interleaver 50 supplies are applied to a first input port of a second two-input exclusive-NOR gate, which has the prescribed sequence of $Z_1$ bits applied to its second input port. The ONEs that the second exclusive-NOR gate generates in the 828 symbol epochs of each data segment are counted. The count is compared to a prescribed threshold value, such as 777. If this threshold is exceeded, this is an indication that the data segment was transmitted using symbols with a predetermined sequence of $Z_1$ bits. This indication conditions a third pair of tri-states to assert the 11 bit pair from low source impedances on the output lines from the circuitry 51.

The circuitry 51 can determine in the following way that a data segment is transmitted using the full alphabet of 8VSB symbols. Respective counters can be used to count the ONEs in each of the response of the set of eight decoders, each responding with a ONE when and only when a respective one of the eight 3-bit symbol codes occurs. The counts can be compared to a threshold value somewhat above 104, say 127, to determine if one of the symbol codes appears more frequently than would be expected in an 8VSB signal. A plural-input NOR gate is connected for receiving these eight decisions and the decisions concerning whether or not the data segment was transmitted using pseudo-2VSB, E-4VSB as proposed by ETRI/CNU, or symbols with a predetermined sequence of $Z_1$ bits. The response of this plural-input NOR gate being a ONE at the conclusion of a data segment is a reasonably reliable indication that the data segment was transmitted using the full alphabet of 8VSB symbols. This indication conditions a fourth pair of tri-states to assert the 00 bit pair from low source impedances on the output lines from the circuitry 51.

The bit pairs coding the circuitry 51 decisions are supplied to a mapper 52 of the byte pattern in the de-interleaved data field. The mapper 52 extends each bit pair decision by repeating it 206 times, to map the 207 bytes of a data segment as a line of bit pair decisions. A convolutional interleaver 53 generates the pattern of bit pair decisions mapping byte characteristics in the interleaved data field of the baseband DTV signal supplied as response from the digital filtering 47 for equalization of channel response and for rejection of co-channel interfering NTSC signal.

Digital delay circuitry 54 delays the digital filtering 47 response by 105 or so data segments to temporally align it with the bit pairs from the convolutional interleaver 53 that describe symbol usage in the interleaved data field. A plural-mode 12-phase trellis decoder 55 of Viterbi type is connected for receiving the digital filtering 47 response as delayed by the digital delay circuitry 54. When the bit pair decisions from the convolutional interleaver 53 indicate restricted-alphabet symbols are currently being supplied to the plural-mode trellis decoder 55, the decision tree in the trellis decoding is selectively pruned. This pruning excludes decisions that currently received symbols have normalized modulation levels that are excluded from the restricted alphabet of 8VSB symbols currently in use. The trellis decoder 55 is connected to supply bytes of data to a de-interleaver 56 that complements the convolutional interleaver 12 in the DTV transmitter.

More particularly, circuitry similar to that shown in FIG. 2 is associated with the plural-mode 12-phase trellis decoder 55 of Viterbi type. This circuitry provides the trellis decoder 55 information concerning which symbols are precluded at which locations in the data field when the convolutional interleaver 53 supplies the trellis decoder 55 the bit pair 11 as a control signal. The bit pair 11 indicates that the symbols the trellis decoder 55 is receiving are from a restricted alphabet that selects between two groups of possible symbols. Symbols transmitted at −3, −1, +5 and +7 normalized modulation levels are precluded from locations in the data field reserved for the first group of possible symbols. Symbols transmitted at −7, −5, +1 and +3 normalized modulation levels are precluded from locations in the data field reserved for the second group of possible symbols. The ranges of decision in the plural-mode 12-phase trellis decoder 55 are adjusted to accommodate the decision tree being pruned in a time-dependent way as locations in the data field are scanned.

When the convolutional interleaver 53 supplies the bit pair 00 as a control signal indicating to the plural-mode 12-phase trellis decoder 55 that the symbols it currently receives are from ordinary 8VSB transmission, the ranges of decision in the trellis decoder 55 are the conventional ones for receiving A/53 DTV broadcasts. The decision tree in the plural-mode 12-phase trellis decoder 55 is not pruned. When the convolutional interleaver 53 supplies the bit pair 01 as a control signal indicating to the trellis decoder 55 that the symbols it currently receives are from pseudo-2VSB transmission, the ranges of decision are adjusted and the decision tree is pruned in the trellis decoder 55. This is done in such way as to preclude −3, −1, +1 and +3 symbol decisions. When the convolutional interleaver 53 supplies the bit pair 10 as a control signal indicating to the trellis decoder 55 that the symbols it currently receives are from E-4VSB transmission, the ranges of decision are adjusted and the decision tree is pruned in the trellis decoder 55. This is done in such way that so as to preclude −7, −1, +3 and +5 symbol decisions.

Information concerning the symbol sets used for generating each data segment in the de-interleaved data field can be encoded in the "reserved" portions of the data field synchronization data segments, as known in the prior art. Such information can be decoded and used to validate circuitry 51 response. Alternatively, such information can be used by the mapper 52 instead of the circuitry 51 response for determining the pattern of data segments in the de-interleaved data field that are transmitted using symbols from a restricted alphabet. This avoids the need for the digital delay 54. This facilitates hard-decision decoding on which adaptation of the equalization and NTSC rejection filtering is based being constructed to depend on the bit-pair decisions that the convolutional interleaver 53 supplies as to the nature of received symbols, so that tracking of dynamic multipath can be improved.

A novel feature of the FIG. 9 DTV receiver is a 2-segments-to-1 data compressor 57 for data segments decoded from restricted-alphabet symbols. The data compressor 57 is connected for receiving from the de-interleaver 56 successive data segments of de-interleaved data fields. The data compressor 57 is connected for receiving from digital delay circuitry 58 bit pairs indicating previous decisions made by the circuitry 51 concerning whether the data segments the de-interleaver 56 currently supplies were or were not decoded from 8VSB symbols that had alphabet restrictions. The digital delay circuitry 58 delays these bit pairs 104 data segments plus the latent delay of the trellis decoder 55. Supposing a 00 bit pair indicates full 8VSB alphabet, the bits in the bit pair from the circuitry 51 can be ORed to generate indications of whether data were or were not decoded from 8VSB symbols that had alphabet restrictions. The digital delay circuitry 58 can then be modified to delay these single-bit indications rather than bit-pair indications.

The data compressor 57 is selective in operation, its response reproducing without modification data segments decoded from 8VSB symbols that had no alphabet restrictions. The data compressor 57 converts each pair of data segments decoded from restricted-alphabet symbols to a respective single data segment. The data compressor 57 treats the pair of data segments as a succession of $X_2$, $X_1$ bit pairs and eliminates the $X_1$ bits to leave a succession of $X_2$ bits. This succession of $X_2$ bits reproduces the single data segment at original code rate that the DTV transmitter used to generate the pair of data segments at halved code rate.

The trellis decoder 55 can be designed to supply an extension to each byte it supplies, which extension comprises one or more additional bits indicative of the confidence level that the byte is correct. The de-interleaver 56 and the 2-segments-to-1 data compressor 57 can be designed to preserve those byte extensions in their responses, so those byte extensions are available to help locate byte errors in subsequent R-S FEC decoding procedures. The 2-segments-to-1 data compressor 57 is connected for supplying its response to lateral (207, 187) R-S FEC decoding apparatus 59 shown in FIG. 9B.

FIGS. 9B and 9C show parts 60(A) and 60(B), respectively, of operations control circuitry 60 for controlling transverse Reed-Solomon forward-error-correction decoding procedures. Showing the operations control circuitry 60 in two parts is an artifice used in the drawings to avoid running numerous connections from elements shown in FIGS. 9A and 9B to elements shown in FIG. 9C. FIG. 9B shows the operations control circuitry 60 connected for receiving DFS signal, DSS signal and clocking signal at an even multiple of symbol rate via respective connections from the sync signals extraction circuitry 48 in FIG. 9A. These signals are provided with respective delays by means not explicitly shown, which delays compensate for latent delays accumulated in the FIG. 9A circuitry and in the lateral (207, 187) R-S FEC decoding apparatus 59 shown in FIG. 9B. FIG. 9B shows the operations control circuitry 60 connected for receiving the response of the digital delay circuitry 58 in FIG. 9A, which response provides indications of whether data segments were or were not decoded from 8VSB symbols that had alphabet restrictions.

A de-randomizer 61 is connected for providing de-randomized response to 187-byte data packet portions of corrected data segments supplied from the lateral (207, 187) R-S FEC decoding apparatus 59. Header detection apparatus 62 detects the PID portions of the de-randomized data packets to provide the operations control circuitry 60 information concerning the types of corrected data segments supplied from the lateral (207, 187) R-S FEC decoding apparatus 59. The operations control circuitry 60 uses this information when transverse R-S FEC decoding is to be performed only on selected types of data segments. A banked random-access memory 63 is employed in certain transverse R-S FEC decoding procedures. Writing to and reading from the banks of the RAM 63 is controlled by the operations control circuitry 60.

The lateral (207, 187) R-S FEC decoding apparatus 59 is connected for supplying successive bytes of corrected data segments to the RAM 63 to be written into one of two banks of memory therein. Each of these banks of memory is capable of storing the (N+Q) data segments in a supergroup. Each addressed location in the RAM 63 is capable of temporarily storing a byte supplied from the lateral (207, 187) R-S FEC decoding apparatus 59, plus any extension or extensions of that byte. Consider successive supergroups of (N+Q) data segments to be ordinally numbered. The respective cycles of operation for the two banks of the RAM 63 are shifted with respect to each other in time. This shift is such that bytes of odd-numbered supergroups of (N+Q) data segments are written to one bank, and bytes of even-numbered supergroups of (N+Q) data segments are written to the other bank The RAM 63 is operated so that, while bytes of a newly received supergroup of (N+Q) data segments are being written to one bank of the memory, the previous supergroup of (N+Q) data segments that was written to the other bank of memory can be corrected for byte errors. Writing each successive byte of a newly received supergroup of (N+Q) data segments to an addressed storage location in one bank of the RAM 63 is preceded by reading from that storage location a byte from two such supergroups previous. If (N+Q) equals 156 or a multiple thereof, a data segment read from the RAM 63 will occupy the same position in a data field that it had when written into the RAM 63, which simplifies subsequent data de-randomization of data packets.

The operations control circuitry 60 supplies the addressing for writing and reading operations of the RAM 63. The operations control circuitry 60 includes counter circuitry for counting at an even multiple of the rate bytes are supplied from the lateral (207, 187) R-S FEC decoding apparatus 59. The count from this counter circuitry is synchronized with the received data fields and data segments using the synchronizing signals extracted by the synchronization signal extraction circuitry 48. Portions of the count from this counter provides read addressing to a pair of read-only memories. These ROMs respectively generate the addressing supplied to each bank of the RAM 63. Storage locations in one of the RAM 63 banks are addressed by row and by column for being read to a lateral (207, 187) Reed-Solomon forward-error-correction decoding apparatus 64 and then overwritten with a supergroup of (N+Q) data segments supplied from the lateral (207, 187) R-S FEC decoding apparatus 59. Successive addresses occur at the rate bytes are supplied from the lateral (207, 187) R-S FEC decoding apparatus 59.

The initial writing of a supergroup of (N+Q) data segments into a bank of the RAM 63 has to take into account the effects of data compression by the 2-segments-to-1 data compressor 57. The operations control circuitry 60 is connected for receiving the response of digital delay circuitry 58, which response includes indication of the initial data segment in a pair of data segments transmitted using a restricted symbol alphabet. The operations control circuitry 60 arranges for the RAM 63 to be written with a segment of null bytes during the portion of the de-interleaved data field that was originally occupied by the initial data segment in a pair of data segments transmitted using a restricted symbol alphabet. This "shortens" the supergroup of (N+Q) data segments temporarily stored in the RAM 63 so as to reproduce the supergroup of (N+Q) data segments resulting from transverse R-S FEC coding at the transmitter.

While a new supergroup of (N+Q) data segments is being written into one bank of the RAM 63, the storage locations in the other of the RAM 63 banks are transversally addressed for reading to a selected one of an array 65 of transverse Reed-Solomon forward-error-correction decoders. The selection is made by transverse Reed-Solomon forward-error-correction decoder application circuitry 66 responsive to a SELECT A control signal supplied by the operations control circuitry 60. The operations control circuitry 60 determines which transverse R-S FEC decoder, if any, to select from information the lateral (207, 187) R-S FEC decoding apparatus 59 supplies. This information concerns the type of segments including parity bytes of transverse R-S FEC decoding that the R-S FEC decoding apparatus 59 finds to be correctable. After the bytes in each transversal path have had errors therein corrected to the extent the transverse R-S FEC code permits, these bytes are written back to the same storage locations in this other of the RAM 63 banks they were read from.

Successive addresses in the transverse scanning of storage locations in a bank of the RAM 63 occur at a multiple of twice the rate bytes are supplied from the lateral (207, 187) R-S FEC decoding apparatus 59. If only one type of transverse R-S FEC coding is employed in each supergroup of (N+Q) data segments, successive addresses for transverse scanning of storage locations in the RAM 63 can occur at only twice the rate bytes are supplied from the lateral (207, 187) R-S FEC decoding apparatus 59. If two types of transverse R-S FEC coding are employed in each supergroup of (N+Q) data segments, independent transverse scanning of storage locations in the RAM 63 for each type of transverse R-S FEC coding may be desired. Successive addresses for such transverse scans have to be supplied at four times or more the rate bytes are supplied from the lateral (207, 187) R-S FEC decoding apparatus 59. Alternative designs in which transverse scanning of each bank of RAM is clocked independently of the lateral scanning of the other bank of RAM are possible. For example, such designs can be implemented using dual porting techniques.

The (207, 187) Reed-Solomon forward-error-correction decoding apparatus 64 is connected for receiving 207-byte data segments read from the RAM 63 after having been corrected insofar as possible by transverse R-S FEC decoding procedures. The (207, 187) R-S FEC decoding apparatus 64 performs lateral Reed-Solomon forward-error-correction on these 207-byte data segments and toggles the Transport Error Indicator (TEI) bit in each data packet in those segments in which the decoding apparatus 64 finds byte errors that still remain uncorrected. A data de-randomizer 67 is connected for receiving the portion of each data segment supplied by the lateral (207, 187) R-S FEC decoding apparatus 64 other than its twenty R-S FEC code parity bytes as a 187-byte data packet. The data de-randomizer 67 is connected for supplying de-randomized data packets to header detection apparatus 62 and to a transport stream de-multiplexer 69.

The transport stream de-multiplexer 69 responds to the header detection apparatus 62 detecting selected PIDs in certain types of the de-randomized data packets from the data de-randomizer 67 for sorting those types of de-randomized data packets to appropriate packet decoders. For example, video data packets are sorted to an MPEG-2 decoder 70. The MPEG-2 decoder 70 responds to the TEI bit in a data packet indicating that it still contains byte errors by not using the packet and instituting measures to mask the effects of the packet not being used. By way of further example, audio data packets are sorted to an AC-3 decoder 71.

The (207, 187) R-S FEC decoding apparatus 64 supplies corrected 207-byte data segments to a banked random-access memory 72 shown in FIG. 9C. Each addressed location in the RAM 72 is capable of temporarily storing a byte supplied from the lateral (207, 187) R-S FEC decoding apparatus 64, plus any extension or extensions of that byte. Each bank of memory in the RAM 72 is capable of storing the (H+K) data segments in a supergroup used in an ancillary-service transmission. These (H+K) data segments can occur during a number of supergroups of (N+Q) data segments.

The operations control circuitry 60 controls the writing and reading operations of the RAM 72. The lateral (207, 187) R-S FEC decoding apparatus 64 notifies the operations control circuitry 60 when one of the K segments containing parity bytes for a supergroup of transverse (G, H) R-S FEC coding occurs in the response of the decoding apparatus 64 supplied to the RAM 72. Responsive to such notification, the operations control circuitry 60 enables the writing of this segment into a bank of the RAM 72. When one of the H data segments in a supergroup of transverse (G, H) R-S FEC coding occurs in the response of the lateral (207, 187) R-S FEC decoding apparatus 64, it is de-randomized by the data de-randomizer 67 for application to the header detection apparatus 62. The header detection apparatus 62 notifies the operations control circuitry 60 of the occurrence of the de-randomized PID of this de-randomized data segment. Responsive to such notification, the operations control circuitry 60 enables the writing of this data segment into a bank of the RAM 72. A counter within the operations control circuitry 60 keeps track of how many of the (H+K) data segments in the supergroup of transverse (G, H) R-S FEC coding are temporarily stored in a respective bank of the RAM 72. When a full complement of (H+K) data segments is temporarily stored in a respective bank of the RAM 72, the operations control circuitry 60 generates addressing that scans transverse paths through storage locations in that RAM 72 bank These storage locations are read to a selected one of an array 73 of transverse Reed-Solomon forward-error-correction decoders. Transverse Reed-Solomon forward-error-correction decoder application circuitry 74 makes the selection responsive to a SELECT B control signal supplied by the operations control circuitry 60. The operations control circuitry 60 determines which transverse R-S FEC decoder, if any, to select from information the lateral (207, 187) R-S FEC decoding apparatus 64 supplies. This information concerns the type of segments including parity bytes of transverse R-S FEC decoding that the R-S FEC decoding apparatus 64 finds to be correctable. After the bytes in each transversal path have had errors therein corrected to the extent the transverse R-S FEC code permits, these bytes are written back to the same storage locations in the RAM 72 bank they were read from. The operations control circuitry 60 generates addressing for reading the H data segments from the RAM 72 bank to a lateral (207, 187) Reed-Solomon forward-error-correction decoder 75.

The (207, 187) Reed-Solomon forward-error-correction decoder 75 is connected for receiving 207-byte data segments read from the RAM 72 after having been corrected insofar as possible by transverse R-S FEC decoding procedures. The (207, 187) R-S FEC decoder 75 performs lateral Reed-Solomon forward-error-correction on these 207-byte data segments and toggles the Transport Error Indicator (TEI) bit in each data packet in those segments in which the decoder 75 finds byte errors that still remain uncorrected. A data de-randomizer 76 is connected for receiving the portion of each data segment supplied by the lateral (207, 187) R-S FEC decoder 74 other than its twenty R-S FEC code parity bytes as a 187-byte data packet. The data de-randomizer 76 is connected for supplying de-randomized data packets to header detection apparatus 77 and a transport stream de-multiplexer 78. The header detection apparatus 77 responds to the PIDs in the de-randomized data packets to develop control signals for the transport stream de-multiplexer 78. Responsive to these control signals, the transport stream de-multiplexer 78 sorts the de-randomized data packets to appropriate packet decoders. FIG. 9C shows a decoder 79 for the data packets of a first ancillary service and a decoder 80 for the data packets of a second ancillary service, each being connected for receiving selected data packets from the transport stream de-multiplexer 78.

The FIG. 9 DTV receiver can be modified so that RAM 72 is written with data segments selected directly from the response of the lateral (207, 187) R-S FEC decoding apparatus 59, rather than from the response of lateral (207, 187) R-S FEC decoding apparatus 64. This avoids the latent delay associated with temporarily storing data segments in the RAM 63. However, data segments selected directly from the response of the lateral (207, 187) R-S FEC decoding apparatus 59 will generally contain more byte errors than data segments selected from the response of lateral (207, 187) R-S FEC decoding apparatus 64.

The transverse R-S FEC coding schemes thus far described in this specification array the parity bytes for this coding in data segments that have no headers. This permits the parity bytes to be arrayed in fewer data segments, reducing overhead and increasing payload. Arraying the parity bytes in data segments that have no headers also facilitates the transverse code paths being straight and parallel throughout the data field, supposing that the parity bytes of lateral R-S FEC coding are not subjected to transverse R-S FEC coding.

Transverse R-S FEC coding the parity bytes of the lateral R-S FEC coding of data segments containing payload, as well as the payload bytes, improves the strength of the two-dimensional R-S FEC coding, however. The assembling of data segments containing parity bytes for transverse R-S FEC coding results in transverse paths that skew in the correction field relative to their direction in the information payload field.

Arraying the parity bytes in data segments that have no headers has the disadvantage that there is no continuity count associated with each such data segment. Accordingly, when DTV receiver circuitry finds a data segment to be incapable of correction, it may be harder to determine which specific supergroup that data segment may belong to. Alternative embodiments of the invention are contemplated in which the parity bytes of transversal R-S FEC coding are arrayed in data segments that have headers similar to an MPEG-2-compliant data segment, containing a unique PID and a continuity count. The unique PID for such data segments should cause legacy DTV receivers to disregard such data segments, so lateral R-S coding of these data segments can be dispensed with. This saves some overhead.

Alternative embodiments of the invention are contemplated in which all data segments have headers similar to an MPEG-2-compliant data segment, containing a unique PID and a continuity count, and also have lateral R-S FEC coding. With knowledge of the disclosure supra such alternative embodiments are readily designed by one skilled in the art of DTV system design. Such alternative embodiments are explicitly described in U.S. provisional application Ser. No. 60/531,124 filed 19 Dec. 2003.

FIG. 10 lists the steps in a routine that can be carried out in connection with a DTV transmitter as shown in FIG. 1. This routine validates that the operation of legacy receivers will not be disrupted by the insertion of restricted-alphabet data segments into the time-division multiplex (TDM) signal that defines a data field before subsequent convolutional interleaving and trellis coding. A segment slot counter that counts segment slots from one to 312 in a data field and then rolls over back to one is used in the routine. The count therefrom is reset to a number indicative of the segment slot in the data field it is proposed to fill with the final data segment descriptive of a data packet of symbol codes selected from a restricted alphabet. The data packet is randomized with the portion of the PRBS associated with that segment slot, thereby modeling the projected operation of the data randomizer 8. The randomized data packet is then (207, 187) R-S FEC coded, thereby modeling the projected operation of the lateral (207, 187) R-S FEC encoder 9. The resulting 207-byte data segment is called a "seed" data segment because it grows into a pair of data segments when subsequently re-sampled to halve its code rate in accordance with a particular type of alphabet restrictions, modeling the projected operation of the re-sampler 10.

The initial data segment in the pair is subjected to (207, 187) R-S FEC decoding to recover a data packet therefrom, thereby modeling projected operation of the lateral (207, 187) R-S FEC decoder in a legacy DTV receiver. If this data packet has a valid PID and its TEI bit indicates no uncorrected byte error remaining therein, the transport stream de-multiplexer of a legacy DTV receivers would fail to discard the data packet. So, insertion of the pair of data segments in the proposed segment slots of the data field is unacceptable. Accordingly, the FIG. 10 routine is begun again after incrementing the count supplied from the segment slot counter.

However, if the data packet recovered from the (207, 187) R-S FEC decoding of the initial data segment of the pair has an invalid PID or its TEI bit indicates uncorrected byte error remaining therein, the FIG. 10 routine continues. The initial data segment in the pair is subjected to (207, 187) R-S FEC decoding to recover a data packet therefrom, thereby modeling projected operation of the lateral (207, 187) R-S FEC decoder in a legacy DTV receiver. If this data packet has a valid PID and its TEI bit indicates no uncorrected byte error remaining therein, the transport stream de-multiplexer of a legacy DTV receivers would fail to discard the data packet. So, insertion of the pair of data segments in the proposed segment slots of the data field is unacceptable. Accordingly, the FIG. 10 routine is begun again after incrementing the count from the segment slot counter. However, if the data packet recovered from the (207, 187) R-S FEC decoding of the initial data segment of the pair has an invalid PID or its TEI bit indicates uncorrected byte error remaining therein, insertion of the pair of data segments in the proposed segment slots of the data field is acceptable.

The FIG. 10 routine will usually be carried out in software. Indeed, although FIG. 1 shows hardware for performing operations to generate modulating signal for the VSB AM DTV transmitter 19, in many DTV transmitters constructed in accordance with the invention these operations will be implemented in software.

FIG. 11 lists the steps in a routine that can be carried out in connection with a FIG. 1 DTV transmitter modified per FIG. 4. This routine validates that the operation of legacy receivers will not be disrupted by the insertion of pseudo-2VSB data segments into the time-division multiplex (TDM) signal that defines a data field before subsequent convolutional interleaving and trellis coding. The steps are similar to those listed in the FIG. 10 routine, except that the re-sampling steps halve code rate by immediately repeating each bit of the seed data segment, modeling the projected operation of the re-sampler 24.

A time-division multiplex (TDM) signal defines a data field before subsequent convolutional interleaving and trellis coding. A much more elaborate routine than those of FIGS. 10 and 11 is required for validating that the operation of legacy receivers will not be disrupted by the insertion of E-4VSB data segments into this TDM signal.

The FIG. 10 routine is also applicable to the FIG. 6 DTV transmitter. FIG. 12 lists the steps in a subsequent routine for validating that the operation of legacy receivers will not be disrupted by the insertion of restricted-alphabet segments of parity bytes for transverse R-S FEC coding into TDM signal that defines a data field before subsequent convolutional interleaving and trellis coding. A segment slot counter that counts segment slots from one to 312 in a data field and then rolls over back to one is also used in the FIG. 12 routine. The count therefrom is reset to a number indicative of the segment slot in the data field it is proposed to fill with the final data segment descriptive of a data packet of symbol codes selected from a restricted alphabet. The data packet is R-S FEC coded using the second type of lateral (207, 187) R-S FEC coding, thereby modeling the projected operation of the lateral (207, 187) R-S FEC encoder 26 of second type. The resulting 207-byte "seed" data is re-sampled to halve its code rate in accordance with a particular type of alphabet restrictions, modeling the projected operation of the re-sampler 10.

The initial data segment in the pair is subjected to (207, 187) R-S FEC decoding of first type to recover a data packet therefrom, thereby modeling projected operation of the lateral (207, 187) R-S FEC decoder in a legacy DTV receiver. If this data packet has a valid PID and its TEI bit indicates no uncorrected byte error remaining therein, the transport stream de-multiplexer of a legacy DTV receivers would fail to discard the data packet. So, insertion of the pair of data segments in the proposed segment slots of the data field is unacceptable. Accordingly, the FIG. 12 routine is begun again after incrementing the count supplied from the segment slot counter.

However, if the data packet recovered from the (207, 187) R-S FEC decoding of the initial data segment of the pair has an invalid PID or its TEI bit indicates uncorrected byte error remaining therein, the FIG. 12 routine continues. The initial data segment of the pair is subjected to (207, 187) R-S FEC decoding of first type to recover a data packet therefrom, thereby modeling projected operation of the lateral (207, 187) R-S FEC decoder in a legacy DTV receiver. If this data packet has a valid PID and its TEI bit indicates no uncorrected byte error remaining therein, the transport stream de-multiplexer of a legacy DTV receivers would fail to discard the data packet. So, insertion of the pair of data segments in the proposed segment slots of the data field is unacceptable. Accordingly, the FIG. 12 routine is begun again after incrementing the count from the segment slot counter. However, if the data packet recovered from the (207, 187) R-S FEC decoding of the initial data segment of the pair has an invalid PID or its TEI bit indicates uncorrected byte error remaining therein, insertion of the pair of data segments in the proposed segment slots of the data field is acceptable.

The FIG. 11 routine is also applicable to the FIG. 6 DTV transmitter modified per FIG. 4. FIG. 13 lists the steps in a subsequent routine for validating that the operation of legacy receivers will not be disrupted by the insertion of pseudo-2VSB segments of parity bytes for transverse R-S FEC coding into TDM signal that defines a data field before subsequent convolutional interleaving and trellis coding. The steps of the FIG. 13 routine are similar to those listed in the FIG. 12 routine, with the following exceptions. The seed data segment is generated by performing lateral (207, 187) R-S FEC coding of third type, rather than second type, on the randomized data packet to be transmitted using pseudo-2VSB symbols. The re-sampling steps halve code rate by immediately repeating each bit of the seed data segment, modeling the projected operation of the re-sampler 24.

The paths involved in transverse R-S FEC coding are of concern, the nature of these paths being a variable that affects results. A/53 prescribes convolutional interleaving of transmitted DTV signals. The effects of the convolutional interleaving and de-interleaving on the transverse R-S FEC coding paths have to be considered. It is preferable that the bytes within each transverse R-S FEC code are successively transmitted at intervals no shorter than the 77.3 microsecond duration of a data segment. U.S. patent application Ser. No. 10/733,645 filed 12 Dec. 2003 describes a method for assuring this.

What is claimed is:

1. A receiver for trellis decoding a stream of symbols selected from a full symbol alphabet separable into a plurality of component restricted symbol alphabets, each having greater Euclidean distance between its component symbols than said full symbol alphabet has, at least some of which symbols are selected from said plurality of restricted symbol alphabets in accordance with a pattern so as to generate more robust symbol coding, said stream of symbols being Reed-Solomon forward-error-correction coded before being convolutionally interleaved and subsequently trellis coded to generate time-dependent trellis codes in which different sets of symbol codes are precluded at prescribed times so as to increase the Hamming distances between possible trellis codes, said receiver comprising:

apparatus for determining which data segments in said stream of symbols before their convolutional interleaving contained symbols selected from said plurality of restricted symbol alphabets in accordance with said pattern, and for supplying indications of when those data segments occur;

a trellis decoder connected for trellis decoding said stream of symbols to generate a trellis decoding result;

a de-interleaver connected for de-interleaving said trellis decoding result to reproduce said stream of symbols including said more robust symbol coding;

a two-data-segments-to-one data compressor connected for selectively compressing said stream of symbols including said more robust symbol coding reproduced from said de-interleaver, said selective compressing being done responsive to said indications of the occurrence of data segments in said stream of symbols that before their convolutional interleaving contained symbols selected from said plurality of restricted symbol alphabets in accordance with said pattern; and Reed-Solomon decoding apparatus connected for receiving said stream of symbols after being selectively compressed by said two-data-segments-to-one data compressor, said Reed-Solomon decoding apparatus for decoding lateral Reed-Solomon forward-error-correction coding.

2. The claim 1 receiver, wherein said pattern of selecting symbols from said plurality of restricted symbol alphabets is a prescribed pattern that is independent of previously selected symbols.

3. The claim 1 receiver, wherein said pattern of selecting symbols from said plurality of restricted symbol alphabets depends upon previously selected symbols.

4. The claim 1 receiver, wherein said trellis decoder is a Viterbi trellis decoder of a type for responding to information concerning the nature of each byte in said stream of symbols supplied thereto for determining which types of symbols are precluded within each byte, said receiver further comprising:

mapper circuitry, responsive to said indications of when data segments in said stream of symbols before their convolutional interleaving contained symbols selected from said plurality of restricted symbol alphabets in accordance with said pattern, for generating a map of the byte pattern in said stream of symbols before their convolutional interleaving; and a convolutional interleaver responsive to said map of the byte pattern in said stream of symbols before their convolutional interleaving for generating a map of the byte pattern in said stream of symbols after their convolutional interleaving.

5. The claim 4 receiver, wherein said pattern of selecting symbols from said plurality of restricted symbol alphabets is a prescribed pattern that is independent of previously selected symbols.

6. The claim 4 receiver, wherein said pattern of selecting symbols from said plurality of restricted symbol alphabets depends upon previously selected symbols.

7. The claim 4 receiver, wherein said Reed-Solomon decoding apparatus is additionally capable of decoding transverse Reed-Solomon forward-error-correction coding.

8. The claim 7 receiver, wherein said pattern of selecting symbols from said plurality of restricted symbol alphabets is a prescribed pattern that is independent of previously selected symbols.

9. The claim 7 receiver, wherein said pattern of selecting symbols from said plurality of restricted symbol alphabets depends upon previously selected symbols.

10. The claim 1 receiver connected for receiving a radio-frequency carrier modulated with a modulating signal, said receiver further comprising:

front-end circuitry connected for responding to said radio-frequency carrier modulated with said modulating signal to supply an intermediate-frequency carrier modulated with said modulating signal;

analog-to-digital conversion circuitry connected for digitizing said intermediate-frequency carrier modulated with said modulating signal;

a demodulator connected for reproducing said modulating signal by demodulating said intermediate-frequency carrier modulated with said modulating signal; and digital filtering for equalizing said modulating signal as reproduced by said demodulator, thereby generating an equalized reproduced modulating signal for application to said trellis decoder as input signal thereto.

11. The claim 10 receiver, wherein said trellis decoder is a Viterbi trellis decoder of a type for responding to information concerning the nature of each byte in said stream of symbols supplied thereto for determining which types of symbols are precluded within each byte, said receiver further comprising:

mapper circuitry, responsive to said indications of when data segments in said stream of symbols before their convolutional interleaving contained symbols selected from said plurality of restricted symbol alphabets in accordance with said pattern, for generating a map of the byte pattern in said stream of symbols before being convolutionally interleaved; and a convolutional interleaver responsive to said map of the byte pattern in said stream of symbols before their convolutional interleaving for generating a map of the byte pattern in said stream of symbols after being convolutionally interleaved.

12. The claim 11 receiver, wherein said Reed-Solomon decoding apparatus is additionally capable of decoding transverse Reed-Solomon forward-error-correction coding.

13. A receiver for digital television signals, said receiver comprising:

apparatus for receiving the digital television signals which have respective radio frequency carrier waves each modulated by a respective 8VSB amplitude-modulation signal with ⅔ trellis coding, wherein said digital signals include transmissions of ancillary data the bits of which have been randomized bit by bit, the bytes of which randomized ancillary data are then transversely Reed-Solomon coded, and the bits of which transversely Reed-Solomon coded randomized ancillary data are then further encoded with an outer coding that cooperates with said ⅔ trellis coding as inner coding to increase the robustness of said transmissions of ancillary data;

apparatus for converting a selected one of said radio frequency carrier waves each modulated by a respective 8VSB amplitude-modulation signal with ⅔ trellis coding to a baseband signal with ⅔ trellis coding;

apparatus for decoding portions of said baseband signal with ⅔ trellis coding that are further encoded with said outer coding, thereby to reproduce said ancillary data the bits of which have been randomized and the bytes of which have been transversely Reed-Solomon coded;

transverse Reed-Solomon decoding apparatus for decoding said ancillary data the bits of which have been randomized and the bytes of which have been transversely Reed-Solomon coded, thereby to reproduce said ancillary data the bits of which have been randomized; and a data de-randomizer connected for reproducing said ancillary data in response to said ancillary data the bits of which have been randomized.

14. The claim 13 receiver wherein said apparatus for decoding portions of said baseband signal with ⅔ trellis coding that are further encoded with said outer coding comprises:

a two-data-segments-to-one data compressor that deletes alternate bits of said portions of said baseband signal with ⅔ trellis coding that are further encoded with said outer coding.

15. A receiver for digital television signals, said receiver comprising:

apparatus for receiving the digital television signals which have respective radio frequency carrier waves each modulated by a respective 8VSB amplitude-modulation signal with ⅔ trellis coding, wherein said digital television signals include transmissions of ancillary data the bits of which have been randomized bit by bit, the bytes of which randomized ancillary data are then coded with two-dimensional coding that includes transverse Reed-Solomon coding, and the bits of which resulting two-dimensionally coded randomized ancillary data are then further encoded with an outer coding that cooperates with said ⅔ trellis coding as inner coding to increase the robustness of said transmissions of ancillary data apparatus for converting a selected one of said radio frequency carrier waves each modulated by a respective 8VSB amplitude-modulation signal with ⅔ trellis coding to a baseband signal with ⅔ trellis coding;

apparatus for decoding portions of said baseband signal with ⅔ trellis coding that are further encoded with said outer coding, thereby to reproduce said ancillary data the bits of which have been randomized and the bytes of which have been two-dimensionally coded; and two-dimensional decoding apparatus for decoding said ancillary data the bits of which have been randomized and the bytes of which have been two-dimensionally coded, thereby to reproduce said ancillary data that have been randomized, said two-dimensional decoding apparatus including apparatus for decoding said transverse Reed-Solomon coding and apparatus for decoding lateral coding of the bytes of said ancillary data and a data de-randomizer connected for reproducing said ancillary data in response to said ancillary data that have been randomized.

16. The claim 15 receiver wherein said apparatus for decoding lateral coding of the bytes of said ancillary data essentially consists of a lateral (207, 187) Reed-Solomon decoder following said transverse Reed-Solomon decoding apparatus, in a cascade connection therewith.

17. The claim 15 receiver wherein said apparatus for decoding portions of said baseband signal with ⅔ trellis coding that are further encoded with said outer coding comprises:

a two-data-segments-to-one data compressor that deletes alternate bits of said portions of said baseband signal with ⅔ trellis coding that are further encoded with said outer coding.

18. A receiver for digital television signals, said receiver comprising:

apparatus for receiving the digital television signals which have respective radio frequency carrier waves each modulated by a respective 8VSB amplitude-modulation signal with ⅔ trellis coding, wherein said digital television signals include transmissions of ancillary data the bits of which have been randomized bit by bit, the bytes of which randomized ancillary data are then coded with two-dimensional coding that includes transverse Reed-Solomon coding, and the bits of which resulting two-dimensionally coded randomized ancillary data are then further encoded with an outer coding, bytes of said outer coding being interspersed in a prescribed way with bytes of randomized principal data such that said outer coding cooperates with said ⅔ trellis coding as inner coding to increase the robustness of said transmissions of ancillary data;

apparatus for converting a selected one of said radio frequency carrier waves each modulated by a respective 8VSB amplitude-modulation signal with said ⅔ trellis coding to a baseband signal with said ⅔ trellis coding;

apparatus for selecting bytes of said baseband signal that have been subjected to said outer coding as well as said ⅔ trellis coding and arranging them successively;

apparatus for decoding said selected bytes of said baseband signal as successively arranged, thereby to reproduce said ancillary data the bits of which have been randomized and the bytes of which have been two-dimensionally coded; and two-dimensional decoding apparatus for decoding said ancillary data the bits of which have been randomized and the bytes of which have been two-dimensionally coded, thereby to reproduce said ancillary data that have been randomized, said two-dimensional decoding apparatus including apparatus for decoding said transverse Reed-Solomon coding and apparatus for decoding lateral coding of the bytes of said ancillary data and a data de-randomizer connected for reproducing said ancillary data in response to said ancillary data that have been randomized.

19. The claim 18 receiver wherein said apparatus for decoding lateral coding of the bytes of said ancillary data essentially consists of a lateral (207, 187) Reed-Solomon decoder following said transverse Reed-Solomon decoding apparatus, in a cascade connection therewith.

20. The claim 18 receiver wherein said apparatus for decoding portions of said baseband signal with ⅔ trellis coding that are further encoded with said outer coding comprises:

a two-data-segments-to-one data compressor that deletes alternate bits of said portions of said baseband signal with ⅔ trellis coding that are further encoded with said outer coding.

* * * * *